United States Patent
Goyal et al.

(10) Patent No.: US 10,025,634 B2
(45) Date of Patent: Jul. 17, 2018

(54) TRANSPARENT HIGH AVAILABILITY FOR STATEFUL SERVICES

(71) Applicant: BROCADE COMMUNICATIONS SYSTEMS, INC., San Jose, CA (US)

(72) Inventors: Girish K. Goyal, Fremont, CA (US); Suresh Vobbilisetty, San Jose, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 35 days.

(21) Appl. No.: 15/141,617

(22) Filed: Apr. 28, 2016

(65) Prior Publication Data

US 2016/0246650 A1   Aug. 25, 2016

Related U.S. Application Data

(63) Continuation of application No. 13/747,348, filed on Jan. 22, 2013, now Pat. No. 9,342,348.
(Continued)

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/50* | (2006.01) |
| *G06F 11/14* | (2006.01) |
| *G06F 9/455* | (2018.01) |
| *G06F 11/30* | (2006.01) |
| *G06F 11/20* | (2006.01) |

(52) U.S. Cl.
CPC ........ *G06F 9/5016* (2013.01); *G06F 9/45558* (2013.01); *G06F 9/46* (2013.01); *G06F 11/1484* (2013.01); *G06F 11/202* (2013.01); *G06F 11/302* (2013.01); *G06F 11/3055* (2013.01); *G06F 11/3079* (2013.01); *G06F 2009/4557* (2013.01); *G06F 2201/865* (2013.01)

(58) Field of Classification Search
None
See application file for complete search history.

(56) References Cited

U.S. PATENT DOCUMENTS

| | | |
|---|---|---|
| 5,729,710 A | 3/1998 | Magee et al. |
| 6,223,267 B1 | 4/2001 | Hodges et al. |

(Continued)

*Primary Examiner* — Chat Do
*Assistant Examiner* — William C Wood
(74) *Attorney, Agent, or Firm* — Shun Yao; Park, Vaughan, Fleming & Dowler LLP

(57) ABSTRACT

One embodiment of the present invention provides a system. The system includes a high availability module and a data transformation module. During operation, the high availability module identifies a modified object belonging to an application in a second system. A modification to the modified object is associated with a transaction identifier. The high availability module also identifies a local object corresponding to the modified object associated with a standby application corresponding to the application in the second system. The data transformation module automatically transforms the value of the modified object to a value assignable to the local object, including pointer conversion to point to equivalent object of the second system. The high availability module updates the current value of the local object with the transformed value.

16 Claims, 16 Drawing Sheets

Related U.S. Application Data

(60) Provisional application No. 61/589,780, filed on Jan. 23, 2012.

(56) References Cited

U.S. PATENT DOCUMENTS

| | | | |
|---|---|---|---|
| 7,076,689 B2 * | 7/2006 | Atkinson | G06F 11/2038 714/11 |
| 7,814,128 B2 | 10/2010 | Silvers et al. | |
| 7,987,159 B2 | 7/2011 | Gopal et al. | |
| 8,108,722 B1 | 1/2012 | Havemose et al. | |
| 2002/0165724 A1 | 11/2002 | Blankesteijn | |
| 2005/0204183 A1 * | 9/2005 | Saika | G06F 11/2025 714/4.11 |
| 2006/0090097 A1 | 4/2006 | Ngan et al. | |
| 2006/0123098 A1 * | 6/2006 | Asher | G06F 11/2097 709/218 |
| 2006/0230044 A1 | 10/2006 | Utiger | |
| 2008/0162983 A1 * | 7/2008 | Baba | G06F 11/0712 714/3 |
| 2009/0070761 A1 | 3/2009 | Zhao | |
| 2010/0023667 A1 * | 1/2010 | Fukutomi | G06F 13/24 710/269 |
| 2010/0082547 A1 * | 4/2010 | MacE | G06F 11/1435 707/648 |
| 2011/0088003 A1 * | 4/2011 | Swink | H04L 51/32 715/863 |
| 2012/0110182 A1 * | 5/2012 | Barsness | G06F 9/5033 709/226 |
| 2012/0166390 A1 * | 6/2012 | Merriman | G06F 17/30578 707/613 |
| 2012/0210428 A1 | 8/2012 | Blackwell | |
| 2012/0239730 A1 * | 9/2012 | Revanuru | G06F 15/17318 709/203 |

* cited by examiner

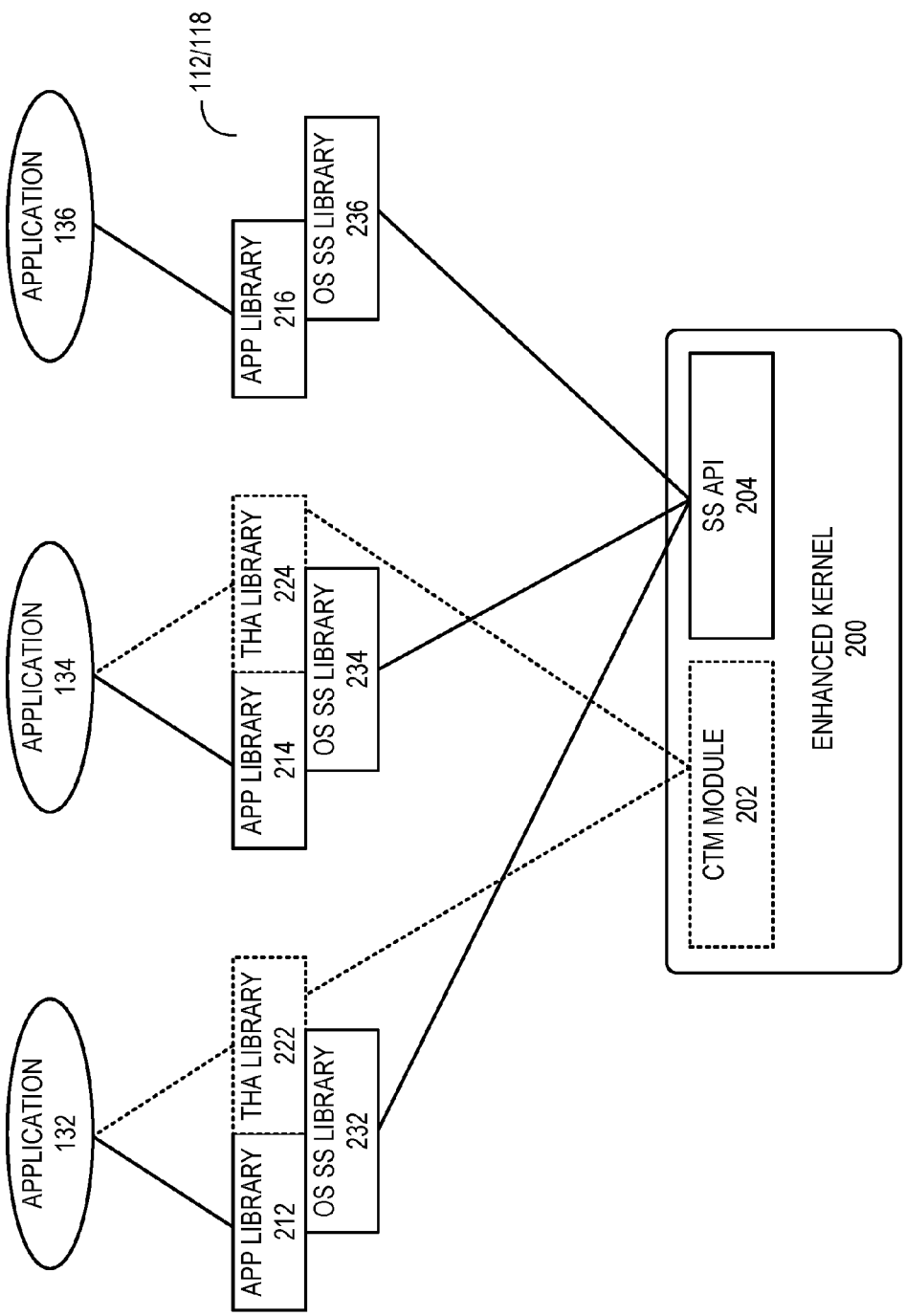

TRANSPARENT HIGH AVAILABILITY FOR STATEFUL SERVICES

RELATED APPLICATION

This application is a continuation application of application Ser. No. 13/747,348, titled "Transparent High Availability for Stateful Services," by inventors Girish K. Goyal and Suresh Vobbilisetty, filed 22 Jan. 2013, which claims the benefit of U.S. Provisional Application No. 61/589,780, titled "Transparent High Availability for Stateful Services," by inventor Girish K. Goyal, filed 23 Jan. 2012, the disclosures of which are incorporated by reference herein.

BACKGROUND

Field

The present disclosure relates to service availability. More specifically, the present disclosure relates to a method and system for transparently providing high availability to services.

Related Art

High availability enables a system to provide continuous services with minimum or no disruption in a failure scenario. However, supporting high availability in an existing or new system can be complex, error prone, and costly. Consequently, deployment of critical high availability features to systems often face delays and causes unwanted disruption to services. Technology vendors usually provide fault resilient services using an active-standby model. In this model, all services (also referred to as applications) run in an active system and all services requiring high availability (can be referred to as fault resilient services or applications) replicate and synchronize their critical states in a standby system. The active or standby system can be a physical or virtual device. If the active system suffers a hardware or software failure, the replicated fault resilient services in the standby system take over and resume the operations without disruption.

Fault resilient applications running on an active system usually use the synchronization infrastructure provided in an operating system (OS) to replicate state changes to the corresponding standby system. However, in this approach, a respective application is responsible for managing and synchronizing the application states. These states are known only to the application and the application is required to serialize and de-serialize the states. The application is also responsible for sending the states via the operating system synchronization services to the standby system.

Different applications running on a system can have states which have interdependencies. For example, some operations can cause state updates for a plurality of applications. The operating system synchronization service usually does not provide any coordinated state synchronization across these multiple related applications. A respective fault resilient application synchronizes its states with the standby system, independent of any other application in the system. As a result, an application needs to explicitly inform other related applications regarding the state updates.

While high availability brings many desirable features to applications, some issues remain unsolved in providing transparency and coordination to the high availability synchronization process.

SUMMARY

One embodiment of the present invention provides a system. The system includes a high availability module and a data transformation module. During operation, the high availability module identifies a modified object belonging to an application in a second system. A modification to the modified object is associated with a transaction identifier. The high availability module also identifies a local object corresponding to the modified object associated with a standby application corresponding to the application in the second system. The data transformation module transforms the value of the modified object to a value assignable to the local object. The high availability module updates the current value of the local object with the transformed value.

In a variation on this embodiment, the local object and the modified object have the same identifier. This identifier is unique in the standby application and the application in the second system.

In a variation on this embodiment, the high availability module identifies a plurality of modified objects associated with the transaction identifier and determines whether updates to the plurality of modified objects have been completed. If completed, the high availability module commits the update of the local object.

In a further variation, the high availability module stores an intent associated with the transaction identifier. The intent specifies the modifications to the modified object. The high availability module discards the intent in response to committing the update and provide the intent to the standby application in response to detecting a failure to the second system before committing the update, thereby allowing the standby application to re-execute the modification to the object In a variation on this embodiment, the system also includes a kernel interface module which determines whether a memory page containing one or more objects associated with an application has been modified.

In a variation on this embodiment, while identifying the modified object, the high availability module receives a modified memory page associated with the application in the second system and identifies a modified object from the modified memory page. This modified object includes a value different from a previously stored value of the modified object.

In a variation on this embodiment, the high availability module receives a registration request for one or more of: an application, an object associated with the application, and an object group. This object group comprises of one or more objects associated with the application. The high availability module then tracks memory activity of the system based on the registration request.

In a variation on this embodiment, the modified object represents dynamically allocated memory in the second system. The high availability module then determines an amount of the dynamically allocated memory in the second system, determines a data layout of the modified object, and dynamically allocates memory to the standby application based on the amount of the dynamically allocated memory and the data layout.

In a variation on this embodiment, the data transformation module transforms a value of an unmodified opaque object to a value assignable to a local object associated with a standby application. This opaque object is incompletely defined. The high availability module also deposits the transformed value into the local object.

One embodiment of the present invention provides a system. The system includes a high availability module and a coordinated transaction manager module. During operation, the high availability module stores a plurality of updates identified by a transaction identifier. These updates are associated with a plurality of related applications in a second system. The coordinated transaction manager module assigns the transaction identifier to the updates and maintains a dependency map representing dependency of the plurality of applications on updates identified by a second transaction identifier. The high availability module commits the updates in response to the dependency map indicating no further dependency.

In a variation on this embodiment, the high availability module discards the updates in response to detecting a failure to the second system before committing the updates.

In a variation on this embodiment, the high availability module receives a request for committing the updates identified by the transaction identifier from one of the plurality of the applications.

In a variation on this embodiment, the high availability module maintains a counter value indicating the number of the plurality of applications associated with the identifier and commits the updates when the counter value indicates all of the plurality of applications has completed updates.

BRIEF DESCRIPTION OF THE FIGURES

FIG. 2 illustrates an exemplary architecture of a transparent high availability infrastructure, in accordance with an embodiment of the present invention.

In the figures, like reference numerals refer to the same figure elements.

DETAILED DESCRIPTION

Figure 1A:
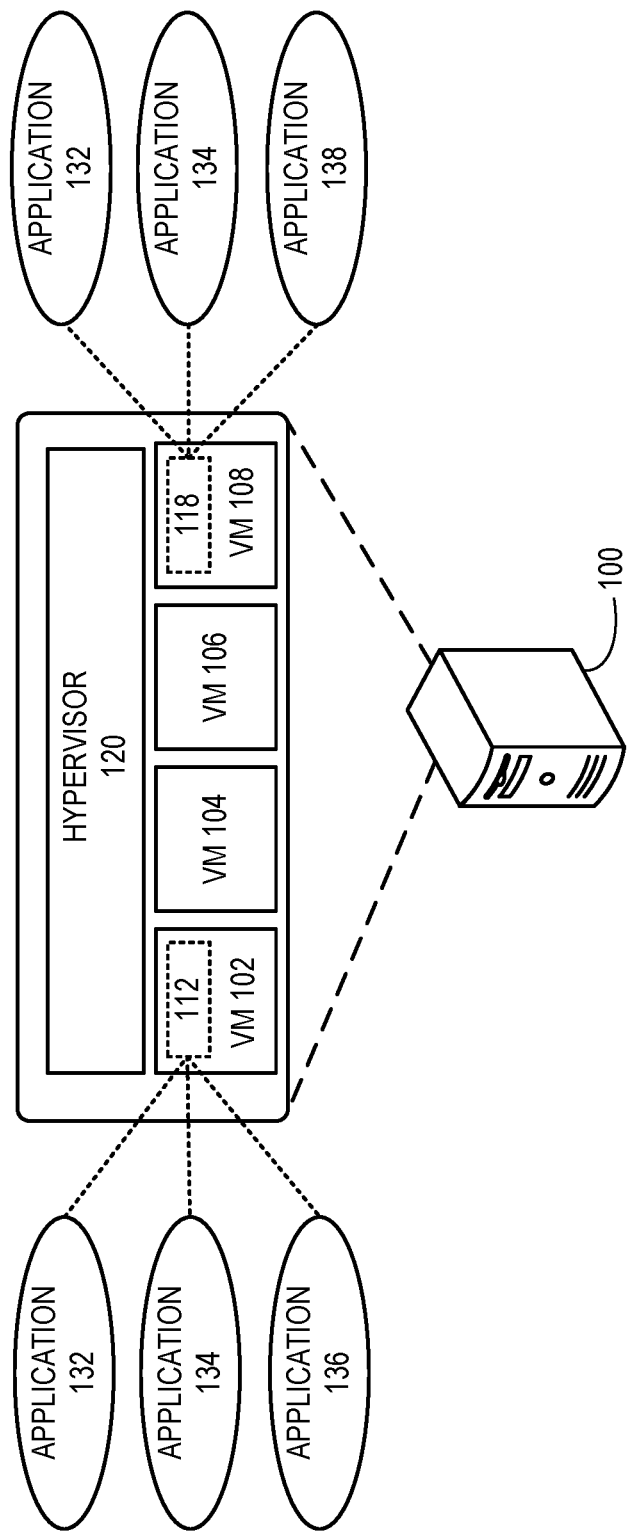
FIG. 1A illustrates exemplary systems providing high availability between virtual machines, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing high availability to applications running on a system is solved by incorporating an infrastructure to the system which provides transparency and coordination to high availability. An active system can provide high availability by having at least one additional system as a standby. The active or the standby system can be any physical or virtual device. A respective application requiring high availability (can be referred to as a fault resilient application) running in the active system replicates its critical state on the standby system. An application state includes any data in memory allocated statically at compile time or dynamically at run time, along with the layout of that data. This data layout can correspond to a predefined or application specific data structure. If the active system becomes unavailable (e.g., suffers a hardware or software failure), the standby system performs a failover by resuming the operations of the active system without disruption.

However, a respective fault resilient application in the active system is usually responsible for managing and synchronizing the states requiring high availability (can be referred to as fault resilient states) with the corresponding application in the standby system. As a result, the application requires separate serialization (i.e., the process of converting a state into a format that can be reconstructed in the same or another system) and de-serialization codes for synchronizing all fault resilient states and subsequent incremental changes. If the fault resilient states for the application changes, both codes have to be updated. An example of such change can include addition or deletion of new fields to or from a data structure. Moreover, the application is required to validate serialization and de-serialization of a respective required field. The system discovers any field missed by the application only after an unsuccessful failover attempt.

Furthermore, if a particular operation in the active system causes state updates for a plurality of applications, these affected applications become related to each other and need to ensure consistency for each other. Under such a scenario, the state updates in the standby system remain inconsistent until the standby system receives all related state updates. If the active system fails before sending all related updates, the standby system can have inconsistent data. During the failover process, the related applications in the standby system need to communicate among each other to ensure a respective related application has consistent data. As a result, the applications become more complex and the failover duration is increased.

To solve this problem, in embodiments of the present invention, both active and standby systems are equipped with a transparent high availability (THA) infrastructure which automates synchronization for fault resilient applications. The infrastructure facilitates automatic transformation of states and provides incremental state updates by automatically detecting state changes. The infrastructure also supports coordinated state synchronization for multiple applications. The infrastructure thus reduces substantial development and testing time of the applications and ensures predictability and reliability in a failover scenario.

During operation, a respective fault resilient application registers its fault resilient states with the infrastructure. The infrastructure creates corresponding metadata for data transformation (e.g., from one software version to another) and automatically detects any change to the states. The infrastructure ensures that the standby system commits state updates (i.e., makes the updates permanent) only when all associated updates are received. As a result, the state updates remain transparent and robust without any inconsistency in state updates. Furthermore, the infrastructure allows coordinated synchronization among a plurality of applications with state dependency, ensuring the committed states in the standby system are always consistent. Such coordinated synchronization thus avoids state reconciliation (i.e., comparing committed state with other applications to ensure state consistency) in a failover scenario. In some embodiments, the infrastructure stores the logs of uncommitted state updates for a respective fault resilient application and allows reconciliation for the application after a failover using the logs.

Although the present disclosure is presented using examples based on the active-standby high availability model, embodiments of the present invention are not limited only to the active-standby model. Embodiments of the present invention are relevant to any mechanism which requires synchronization among multiple systems. The active-standby model can be based on any number of active or standby systems providing high availability to each other. In this disclosure, the terms "active system" and "standby system" are used in a generic sense, and can refer to any software system, virtual device, or physical device. Examples of a physical device include, and but are not limited to, a computing device, a network switch, and a portable electronic device.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and can refer to any standalone or fabric switch operating in any network layer. "Switch" should not be interpreted as limiting embodiments of the present invention to layer-2 networks. Any physical or virtual device that can forward traffic in a network can be referred to as a "switch." Examples of a "switch" include, but are not limited to, a layer-2 switch, a layer-3 router, a Transparent Interconnection of Lots of Links (TRILL) routing bridge (RBridge), or a virtual machine with frame forwarding capability.

The term "synchronization" is used in a generic sense, and can refer to any process which shares or replicates information among systems. Examples of such process include, but are not limited to, memory sharing, data bus sharing, message passing, and data frame exchanges. The term "update" is used also in a generic sense, and can refer to any process which changes information in a system.

The term "application" is used in a generic sense, and can refer to any software or hardware entity which executes instructions to perform certain operations. An application can reside in a system and provide specific services. In this disclosure, the terms "application" and "service" are used interchangeably. An application can have one or more states. The term "state" can represent the current operation and memory condition of the corresponding application. Examples of a state include, but are not limited to, one or more global, local, static, or dynamic variable or pointer values, memory allocation, and function call stack. A state can be represented by one or more objects. An object can represent a contiguous chunk of memory containing application state which needs to be synchronized. In this disclosure, the terms "state" and "object" are used interchangeably.

System Architecture

FIG. 1A illustrates exemplary systems providing high availability between virtual machines, in accordance with an embodiment of the present invention. A physical device 100 hosts virtual machines 102, 104, 106, and 108 using hypervisor 120. Virtual machines in device 100 communicates via shared memory, message passing (e.g., via sockets), or a data bus. In some embodiments, hypervisor 120 manages the communication between the virtual machines. In this example, virtual machines 102 and 108 are the active and the standby system, respectively. Applications 132, 134, and 136 run in active virtual machine 102. Applications 132 and 134 are fault resilient and, hence, replicated in standby virtual machine 108. Additionally, application 138 runs on virtual machine 108. Note that applications 136 and 138 do not require high availability. Transparent high availability infrastructure 112 and 118 run in virtual machines 102 and 108, respectively, and facilitate transparent high availability between virtual machines 102 and 108.

Without transparent high availability infrastructure 112 and 118, applications 132 and 134 in virtual machine 102 are responsible for synchronizing states with corresponding applications in virtual machine 108. These states include any data in memory allocated statically at compile time or dynamically at run time, along with the layout of that data. Applications 132 and 134 individually maintain the code for synchronization. If application 132 or 134 misses any data associated with the fault resilient states, virtual machine 108 discovers the missing data only after an unsuccessful failover attempt. Such data can be represented by one or more objects. An object represents a contiguous segment of memory containing data associated with application states. Furthermore, if an operation in virtual machine 102 causes state updates for both applications 132 and 134, corresponding state updates in virtual machine 108 remain inconsistent until both applications 132 and 134 individually synchronize their respective updated states. If virtual machine 102 fails after only one of applications 132 and 134 has synchronized the updates, virtual machine 108 can have inconsistent data.

Transparent high availability infrastructure 112 and 118 solve these problems by providing transparency and coordination to the synchronization process of applications 132 and 134. During operation, applications 132 and 134 in virtual machine 102 register their fault resilient states (i.e., the objects representing the states) with infrastructure 112. The burden of serialization and de-serialization shifts from applications 132 and 134 to infrastructures 112 and 118. If a fault resilient state changes in application 132, application 132 simply asks infrastructure 112 to synchronize changed state with the standby instance in virtual machine 108. Infrastructure 112, in turn, shares the updated information with infrastructure 118.

During the registration process, applications 132 and 134 provide infrastructure 112 with metadata, such as size, length, location, and data layout, associated with the objects. When virtual machine 108 becomes operational, infrastructure 112 sends the metadata to infrastructure 118. Infrastructure 118 identifies the fault resilient states in the local version of applications 132 and 134 based on the metadata. In some embodiments, the software version of one of or both applications 132 and 134 in virtual machine 108 can be different from the corresponding applications in virtual machine 102. Infrastructure 118 then creates transformation map for the objects based on the corresponding metadata of the software version in virtual machine 102 and the software version in virtual machine 108. For example, an object of application 132 can be a 16-bit integer in virtual machine 102 while a 32-bit integer in virtual machine 108. Infrastructure 118 creates a map to transparently transform the 16-bit integer to a 32-bit integer.

When application 132 instructs infrastructure 112 to synchronize, infrastructure 112 determines which registered objects have changed, serializes the changed objects, and sends the serialized objects to infrastructure 118. Infrastructure 118 then de-serializes the objects and updates the corresponding local objects based on the transformation map. For any subsequent synchronization instruction from application 132, infrastructure 112 transparently detects the updates in the objects of application 132 and sends the memory pages comprising the objects to infrastructure 118. Infrastructure 118 commits the changes only when all modified objects associated with the synchronization instruction are received, thereby ensuring data consistency. As a result, the synchronization process between infrastructures 112 and 118 remains robust without any inconsistent data.

Furthermore, infrastructures 112 and 118 allow coordinated synchronization among applications 132 and 134. If an operation in virtual machine 102 causes state updates for applications 132 and 134, infrastructure 112 allocates a global identifier to the update and keeps track of the update for applications 132 and 134 using the identifier. Only when the update is completed by both applications 132 and 134, infrastructure 118 commits the updates. In some embodiments, before committing, the infrastructure also ensures that no other updates are ongoing for applications 132 and 134. In this way, infrastructures 112 and 118 provide consistency to the committed states in virtual machine 108. In some embodiments, infrastructure 112 sends the updates to infrastructure 118 as soon as the operation is done in a respective application. However, infrastructure 118 simply logs the received updates in local memory without committing the updates. When all updates are completed, infrastructure 112 instructs infrastructure 118 to commit the state of applications 132 and 134 atomically on the standby instance in virtual machine 108. If a failover happens during the coordinated synchronization process, infrastructure 118 discards any uncommitted state updates, thereby ensuring that either all or none of the state updates are applied and a respective application state is always consistent. Applications 132 and 134 can optionally associate an intent with a specific update such that if the corresponding update is discarded, the application can retrieve the associated intent and re-execute the operations after the failover.

Note that virtual machines 102 and 108 can communicate with each other via a shared memory. In some embodiments, hypervisor 120 manages the shared memory. Virtual machines 102 and 108 have shared access to a portion of the memory. Virtual machine 108 keeps the committed states in the shared memory. If virtual machine 102 fails, the shared memory is still preserved and virtual machine 108 assumes control of the shared memory. Infrastructure 112 can log the uncommitted updates in the shared memory. If the failure occurs during the synchronization process, infrastructure 118 can reconcile the logged updates.

Figure 1B:
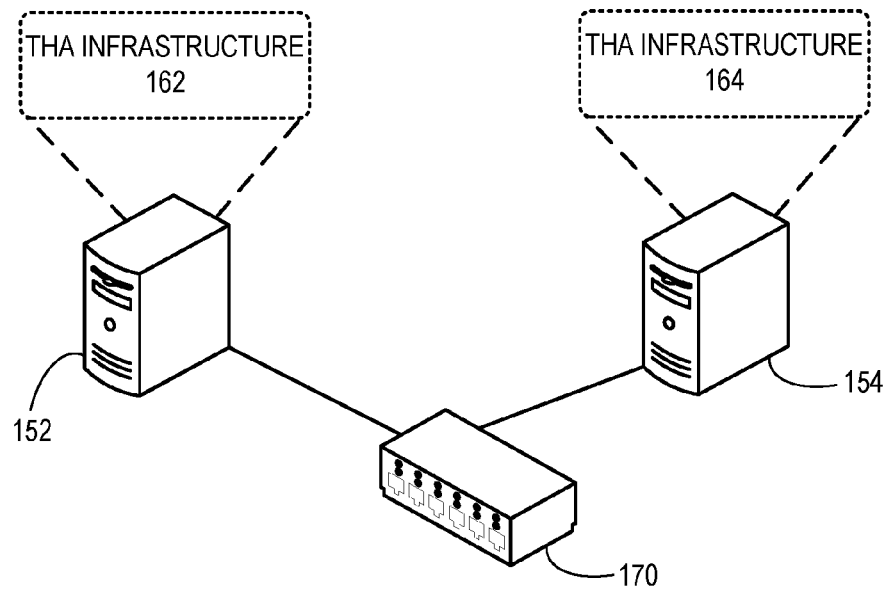
FIG. 1B illustrates exemplary systems providing high availability between multiple devices, in accordance with an embodiment of the present invention.

In some embodiments, an active or a standby system can be a physical device. FIG. 1B illustrates exemplary systems providing high availability between multiple devices, in accordance with an embodiment of the present invention. In the example in FIG. 1B, transparent high availability infrastructure 162 operates in active device 152 and transparent high availability infrastructure 164 operates in standby device 154. Devices 152 and 154 are coupled to each other via a network switch 170 and communicate with each other via their respective network interfaces. One of or both infrastructures 162 and 164 can run in a virtual device running on a physical device. For example, infrastructure 162 can run on an operating system (i.e., a kernel) directly operating device 152 while infrastructure 164 can run on an operating system operating a virtual machine running on device 154. Infrastructures 162 and 164 operate the same way as infrastructures 112 and 118 do, respectively, as described in conjunction with FIG. 1A.

Figure 1C:
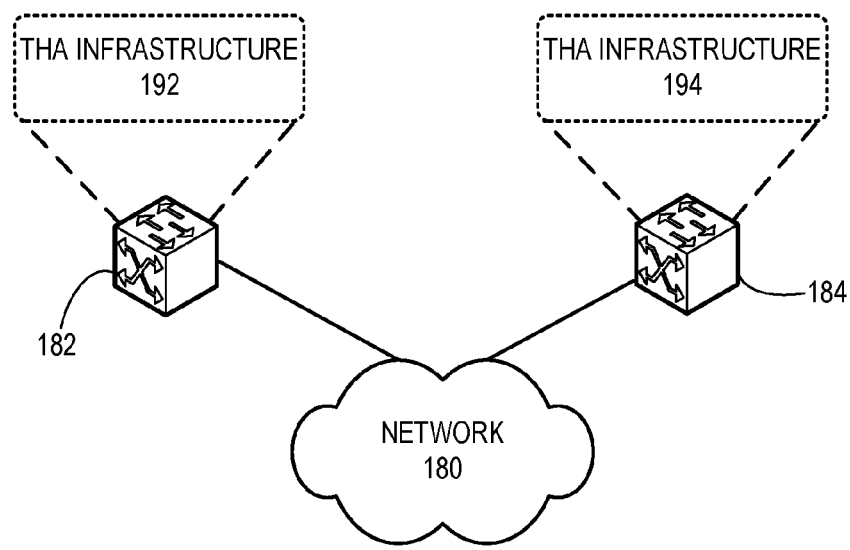
FIG. 1C illustrates exemplary systems providing high availability between multiple switches, in accordance with an embodiment of the present invention.

In some embodiments, an active or a standby system can be a network switch. FIG. 1C illustrates exemplary systems providing high availability between multiple switches, in accordance with an embodiment of the present invention. Transparent high availability infrastructure 192 operates in active network switch 182 and transparent high availability infrastructure 194 operates in standby network switch 184. Switches 182 and 184 are coupled to each other via a network 180 and communicate with each other via their respective network interfaces. Switches 182 and 184 can be coupled to each other via one or more links in network 180. One of or both switches 182 and 184 can be a layer-2 switch, a layer-3 router, a TRILL RBridge, a virtual switch, or any other networking device. In this example, infrastructures 192 sends data (e.g., objects) to infrastructures 194 using data frames. One of or both infrastructures 182 and 184 can run in a virtual device running in a physical device. For example, switch 182 can be a physical switch while switch 184 can be a virtual switch running on a physical device. Infrastructures 182 and 184 operate the same way as infrastructures 112 and 118 do, respectively, as described in conjunction with FIG. 1A.

In some embodiments, a transparent high availability infrastructure operates in conjunction with the synchronization service provided by an operating system. Hence, the architecture of the infrastructure relies on the libraries provided by the operating system. FIG. 2 illustrates an exemplary architecture of a transparent high availability infrastructure, in accordance with an embodiment of the present invention. This example illustrates the architecture of transparent high availability infrastructure 112 (or infrastructure 118) in FIG. 1A. Infrastructure 112 includes transparent high availability libraries 222 and 224, which facilitates high availability to fault resilient states. Libraries 222 and 224 provide a new application programming interface (API) to applications 132 and 134, respectively. Applications 132 and 134 use the API to register and synchronize their corresponding fault resilient states.

In some embodiments, libraries 222 and 224 operate based on the operating system synchronization service (SS) libraries 232 and 234, respectively, and use the corresponding synchronization service API 204 to send and receive updates. Applications 132 and 134 can also use application libraries 212 and 214, respectively, to access libraries 232 and 234, respectively. Because application 136 is not fault resilient, application 136 may not be associated with a transparent high availability library. Applications 136 can use application library 216 to access the standard features of API 204 via synchronization service library 236.

Libraries 222 and 224 rely on coordinated transaction manager (CTM) kernel module 202 for coordinating state synchronization among a group of related application. Kernel module 202 is responsible for managing global identifiers for coordinated synchronization. Kernel module 202 also creates and maintains dependency map to support coordinated state update among a plurality of related applications. Infrastructure 112 uses this dependency map to ensure that all state updates of the related applications are completed before committing the updates, thereby avoiding reconciliation after failover. Kernel 200 provides an API to libraries 222 and 224 for automatically detecting changes to the fault resilient states associated with applications 132 and 134. In this way, libraries 222 and 224 transparently detect the state changes without requiring applications 132 and 134 to track the changes.

States, Objects, and Data Types

A fault resilient state of an application can be represented by one or more objects. An object represents a contiguous segment of memory containing application state which needs to be synchronized. The object can include a single or a group of compile time static or global variables, or dynamically allocated memory. In some embodiments, a respective object is identified by a unique name. To establish a correlation between an object in the active system and the corresponding object in the standby system, the name should be the same for both the objects. A plurality of objects can be grouped together to facilitate a subset of the state to be synchronized at group level. In some embodiments, an object can belong to only one object group. The infrastructure allows the application to independently synchronize a respective object or an object group.

To avoid memory modifications to the same page from both fault resilient and non-fault resilient applications, and efficiently manage memory usage, the infrastructure maintains a memory pool for dynamic memory allocation. When an application requires dynamic memory for a dynamic object, the application requests the transparent high availability infrastructure the required quantity of memory along with an optional prefix to be used to identify the allocated memory. The infrastructure provides the dynamic memory to the application from the memory pool. The infrastructure also assigns an implicit name which uniquely identifies the dynamic object in the active system and provides the name and layout of the object to the corresponding standby system. The infrastructure in the standby system automatically creates the corresponding dynamic object when the corresponding application state is synchronized.

The infrastructure supports primitive data types. Examples of such data type can include, but are not limited to, integer, floating point, character, and pointer. Furthermore, the infrastructure allows the application to construct data structures using these primitive data types. The application can use these data structures for constructing more complex data structures. During operation, the application registers a respective data structure, which comprises of one or more primitive or constructed data structures, with the infrastructure. The application provides the name, offset, type, and size of a respective field in the data structure to the infrastructure for registering the data structure. In some embodiments, the application can specify only those fields which need to be replicated as part of the registration process. After the registration, an application can register and/or create objects of the registered data structure.

Initialization

Figure 3A:
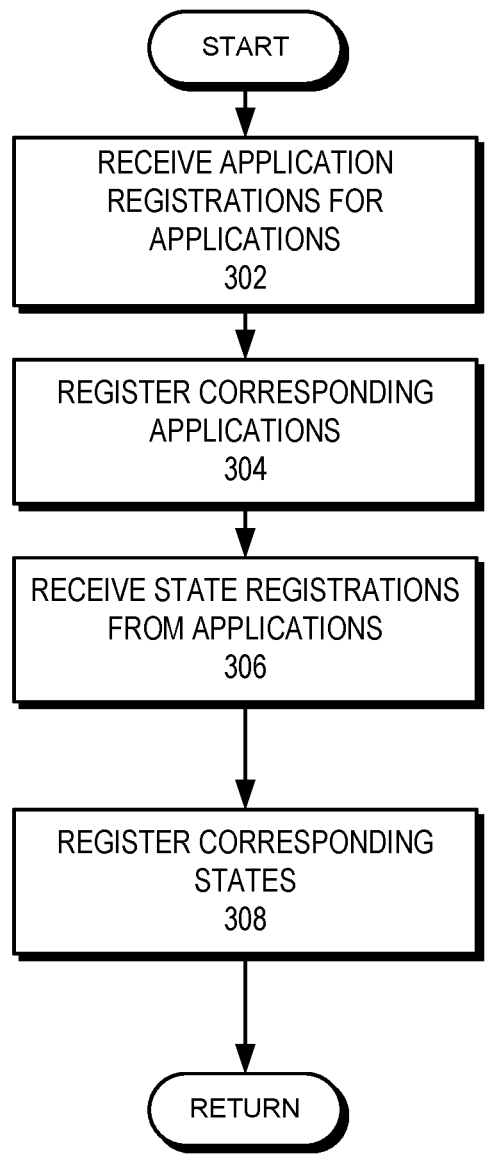
FIG. 3A presents a flowchart illustrating the registration process of a transparent high availability infrastructure, in accordance with an embodiment of the present invention.

In the example in FIG. 1A, application 132 registers itself and its fault resilient states with infrastructure 112. Infrastructure 112, in turn, starts tracking the registered states in memory. During the initialization process, infrastructure 112 shares metadata for objects representing the states with infrastructure 118. FIG. 3A presents a flowchart illustrating the registration process of a transparent high availability infrastructure, in accordance with an embodiment of the present invention. The infrastructure first receives registration from fault resilient applications (operation 302) and registers the applications with the infrastructure (operation 304).

The infrastructure receives state registrations from the applications (operation 306) and registers the corresponding states with the infrastructure (operation 308). The state registration includes metadata associated with the objects representing the states. The metadata can include a unique name, local memory address, length of a respective object, and a data layout for the object. Data layout is specified by associating a predefined or application specific data structures with the object.

Figure 3B:
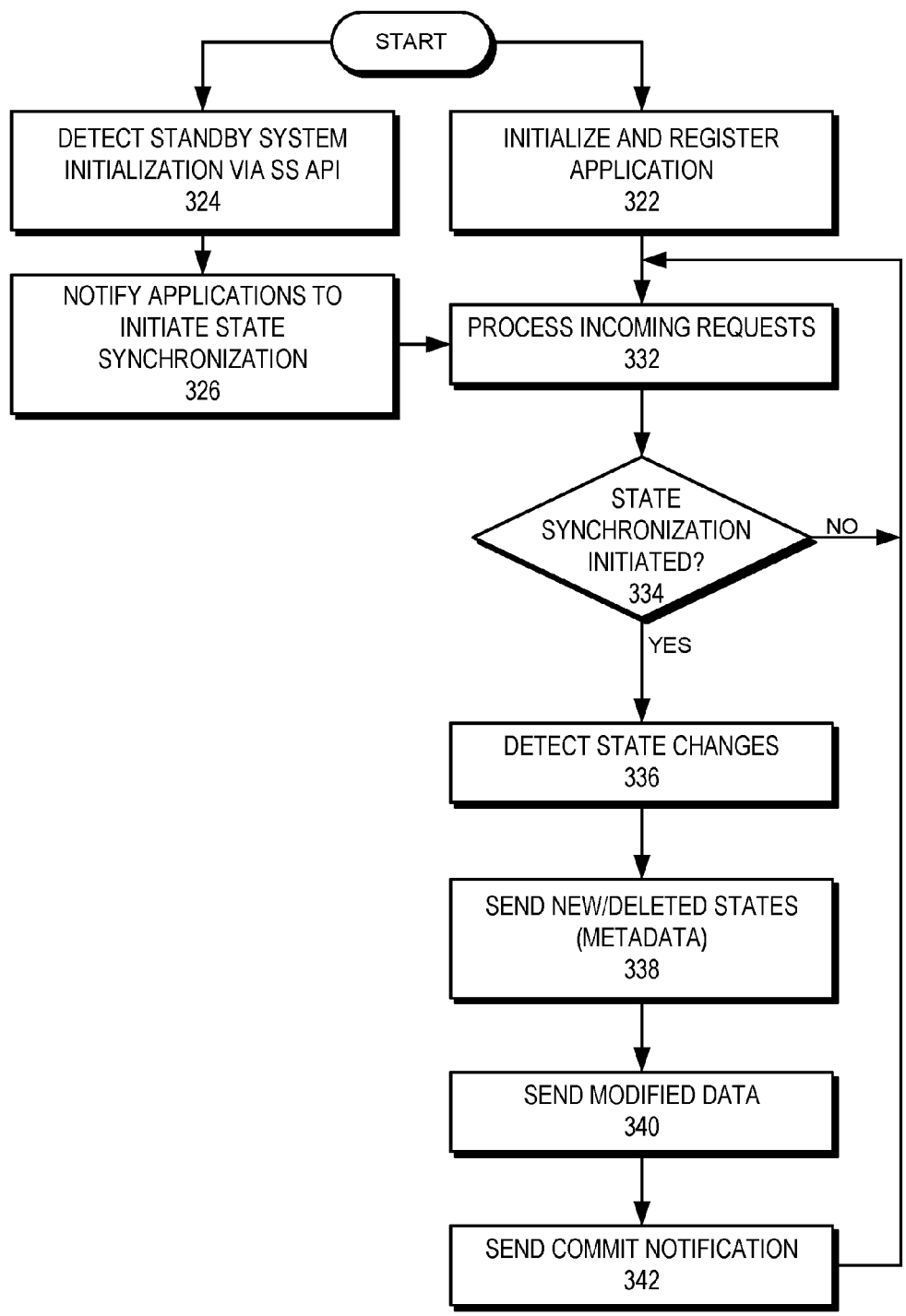
FIG. 3B presents a flowchart illustrating the synchronization process of the transparent high availability infrastructure in an active system, in accordance with an embodiment of the present invention.

FIG. 3B presents a flowchart illustrating the synchronization process of a transparent high availability infrastructure in an active system, in accordance with an embodiment of the present invention. The infrastructure in the active system receives registration for fault resilient applications and their respective fault resilient states, and registers the applications and the states with the infrastructure (operation 322), as described in conjunction with FIG. 3A. The infrastructure also detects initiation of the standby system (e.g., powering up) via the synchronization service API (operation 324), as described in conjunction with FIG. 2, the infrastructure notifies the applications to initiate state synchronization (operation 326). The infrastructure then processes incoming requests (operation 332) and checks whether the state synchronization has been initiated (operation 334). If not, the infrastructure continues to process incoming requests (operation 332).

If the state synchronization has been initiated, the infrastructure detects any state changes (e.g., new/deleted states) (operation 336) and sends the new/deleted states (e.g., the associated metadata) to the infrastructure in the standby system (operation 338). These states can be represented by one or more objects. After sending the states, the infrastructure sends any modified data associated with the objects (operation 340) and associated commit notification (operation 342) to the infrastructure in the standby system. The infrastructure sends the commit notification after sending all modified data to the infrastructure in the standby system.

After sending the commit notification, the infrastructure continues to process incoming requests (operation 332).

Figure 3C:
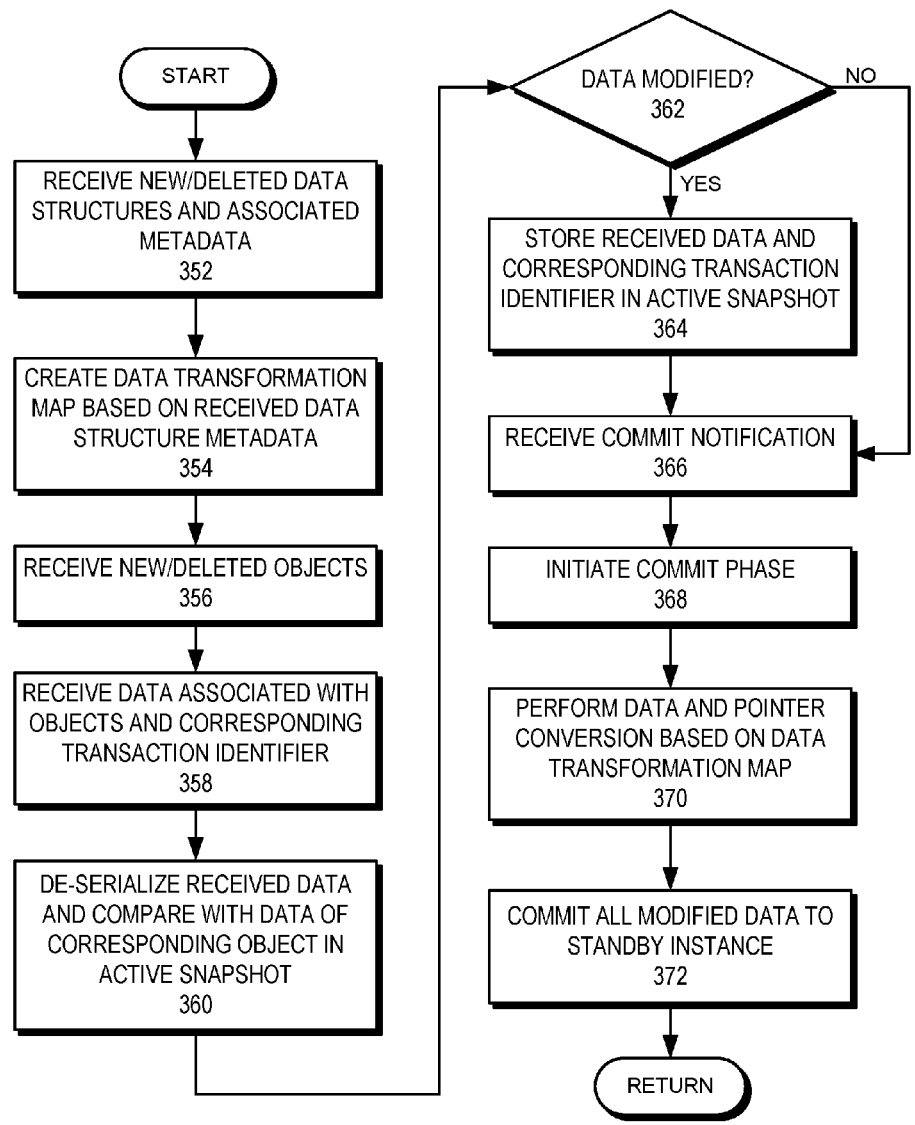
FIG. 3C presents a flowchart illustrating the synchronization process of the transparent high availability infrastructure in a standby system, in accordance with an embodiment of the present invention.

FIG. 3C presents a flowchart illustrating the synchronization process of the transparent high availability infrastructure in a standby system, in accordance with an embodiment of the present invention. When the standby system initiates, the infrastructure first receives registration for fault resilient applications and their respective fault resilient states, and registers the applications and the states with the infrastructure, as described in conjunction with FIG. 3A. During the synchronization process, the infrastructure first receives any new/deleted data structure in the active system and its associated metadata (operation 352). The infrastructure creates a data transformation map for the received data structure based on the received metadata (operation 354) and receives any new/deleted object associated with the data structure in the active system (operation 356). An application can create an object of a registered data structure. The infrastructure receives data associated with the objects and a corresponding transaction identifier (operation 358), de-serializes the received data, and compares with the corresponding data stored in the active snapshot (i.e., a local snapshot of the active system) (operation 360).

The infrastructure checks whether the received data has been modified based on the comparison (operation 362). If so, the infrastructure stores the received data and the transaction identifier in the active snapshot (operation 364). If the received data has not been modified (operation 362) or upon receiving all modifications that requires an atomic update, the infrastructure receives a commit notification from the active system (operation 366) and initiates a commit phase (operation 368) of the synchronization process. The infrastructure performs a data and pointer conversion based on the data transformation map (operation 370). The conversion process is described in further details in conjunction with FIGS. 6A and 6B. Upon completing the modifications and conversions, the infrastructure commits the modified data to the standby instance (operation 372).

State Change Detection

Figure 4A:
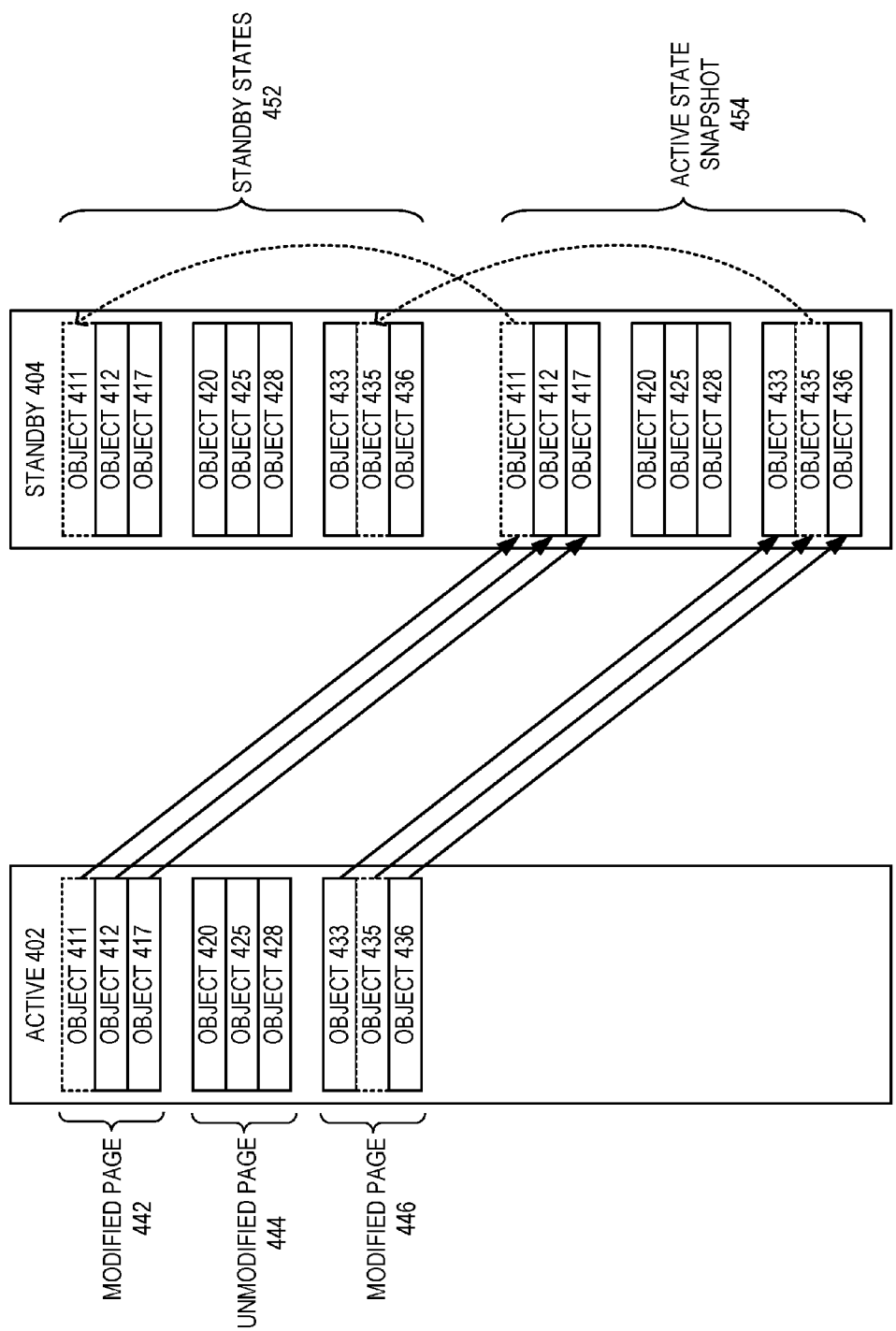
FIG. 4A illustrates an exemplary transparent synchronization using automatic state change detection, in accordance with an embodiment of the present invention.

During the initialization process, a transparent high availability infrastructure builds a map of the memory containing the fault resilient states of the fault resilient applications. In some embodiments, the memory map is at a page granularity. Using this memory map, the infrastructure automatically detects changes to the applications. FIG. 4A illustrates an exemplary transparent synchronization using automatic state change detection, in accordance with an embodiment of the present invention. Memory map in active system 402 includes pages 442, 444, and 446 containing the states of an application. In this example, page 442 includes objects 411, 412, and 417; page 444 includes objects 420, 425, and 428; and page 446 includes objects 433, 435, and 436.

During operation, the application requests the infrastructure to synchronize the states. The infrastructure passes a list of pages 442, 444, and 446 to the enhanced operating system kernel of the active system and obtains a notification indicating the modified pages 442 and 446. The notification can be a bitmap corresponding to the list of pages. The infrastructure performs a reverse lookup to identify objects in modified pages 442 and 446, and sends the identified objects to standby system 404. In some embodiments, the infrastructure sends pages 442 and 446 to standby system 404; and the infrastructure in standby system 404 performs the reverse lookup to identify the objects in pages 442 and 446. The infrastructure in the standby system 404 compares the current data of the identified objects with the corresponding objects in active state snapshot 454. An active snapshot can also be stored in the active system. Under such a scenario, the infrastructure in the active system can perform the comparison. In some embodiments, the infrastructure operates without a copy of snapshot 454, wherein the infrastructure considers all objects in a modified page (e.g., objects 433, 435, 436 in page 446) as modified objects. In some further embodiments, the active system can detect the changes using cache without maintaining a snapshot of the states.

Based on the comparison, the infrastructure identifies the modified objects 411 and 435 (denoted with dotted lines), and updates snapshot 454 with the updated data. If there is no other update associated with the current synchronization, the infrastructure commits the updates to the corresponding objects in standby states 452. In some embodiments, the updates are associated with a transaction identifier, which is stored with the updates. Note that objects 433, 435, 436 can belong to different object groups or contexts.

Figure 4B:
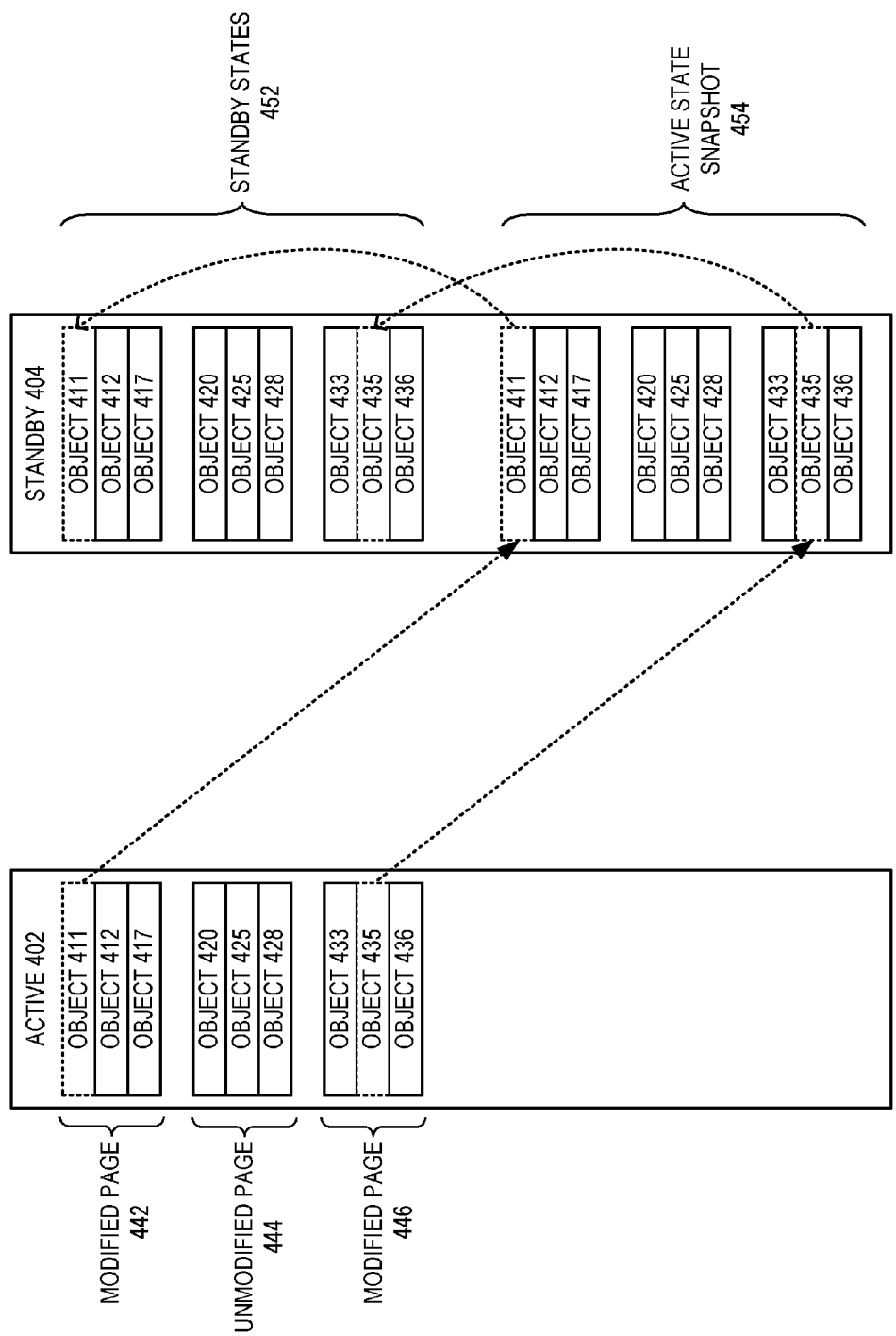
FIG. 4B illustrates an exemplary synchronization using automatic state change detection with application tracking, in accordance with an embodiment of the present invention.

In some embodiments, a respective application in the active system tracks the changes in its objects. FIG. 4B illustrates an exemplary synchronization using automatic state change detection with application tracking, in accordance with an embodiment of the present invention. The application which stores its states in pages 442, 444, and 446 can track the changes in the objects in these pages. During operation, the application detects changes in objects 411 and 435, and sends only objects 411 and 435 to standby system 404. In this way, the data transfer between systems 402 and 404 can be reduced and no additional data comparison is needed on the standby system.

Data Transformation and Commit

Figure 5:
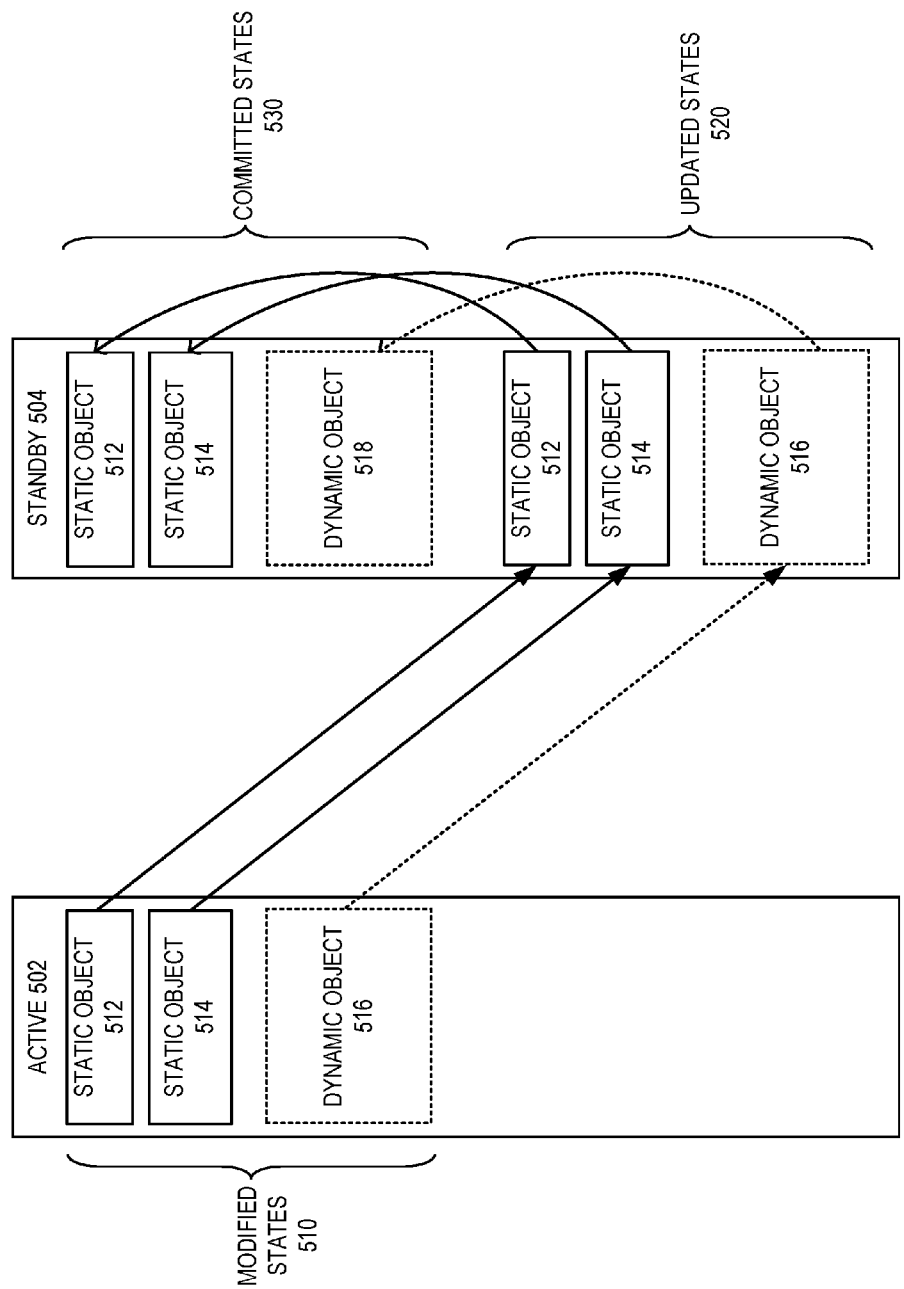
FIG. 5 illustrates an exemplary transparent synchronization using state transformation and commit, in accordance with an embodiment of the present invention.

Synchronization between an active and a standby system can include changes to one or more objects of one or more applications. A transparent high availability infrastructure maintains consistency to the changed objects between the active and standby systems. In some embodiments, to ensure consistency, the transparent high availability infrastructure performs the synchronization process in two phases: update and commit. FIG. 5 illustrates an exemplary transparent synchronization using state transformation and commit, in accordance with an embodiment of the present invention.

During state update phase, the transparent high availability infrastructure in active system 502 automatically detects modified states 510, which includes static objects 512 and 514, and dynamic object 516, as described in conjunction with FIG. 4A. A respective update in modified states is associated with a transaction identifier. For example, updates to objects 512 and 514 can have two corresponding transaction identifiers. The infrastructure tracks the uncommitted updates with these transaction identifiers. When instructed, the infrastructure sends modified states 510 and the associated transaction identifiers to the transparent high availability infrastructure in standby system 504. The infrastructure in standby system 504 receives modifies states 510 and stores a copy in local memory updated states 520.

When the infrastructure in standby system 504 commits the changes associated with a transaction identifier, the infrastructure ensures all changes associated with the identifier are committed atomically. For example, if a modified state updates two objects 512 and 514, the infrastructure ensures both changes are committed to committed states 530. In this commit phase, the infrastructure tracks a respective object and performs necessary data transformation. During this data transformation, the infrastructure creates (and deletes) the local dynamic objects (e.g., dynamic object 516 in updated states 520 and later in committed states 530) corresponding to the modified dynamic object 516 in active system 502. When a dynamic object is deleted, the infrastructure reuses the freed memory by allocating the memory to another dynamic object. In some embodiments, the infrastructure uses "mmap" system call, which maps files or devices into memory, to allocate dynamic memory from a pre-assigned memory pool.

In the example in FIG. 5, when the application associated with objects 512 registers with the infrastructure, the application provides the data layout of object 512 to the infrastructure. The infrastructure in system 502 sends the layout to the infrastructure of system 504. The infrastructure in system 504 uses the data layout to prepare a data transformation map the object. The transformation map allows the location, type, and size of a respective field in object 512 to be different in systems 502 and 504. As a result, systems 502 and 504 can run different software versions of the application. This automatic data transformation between the software versions enables transparent state update between two different software versions of the application.

Figure 6A:
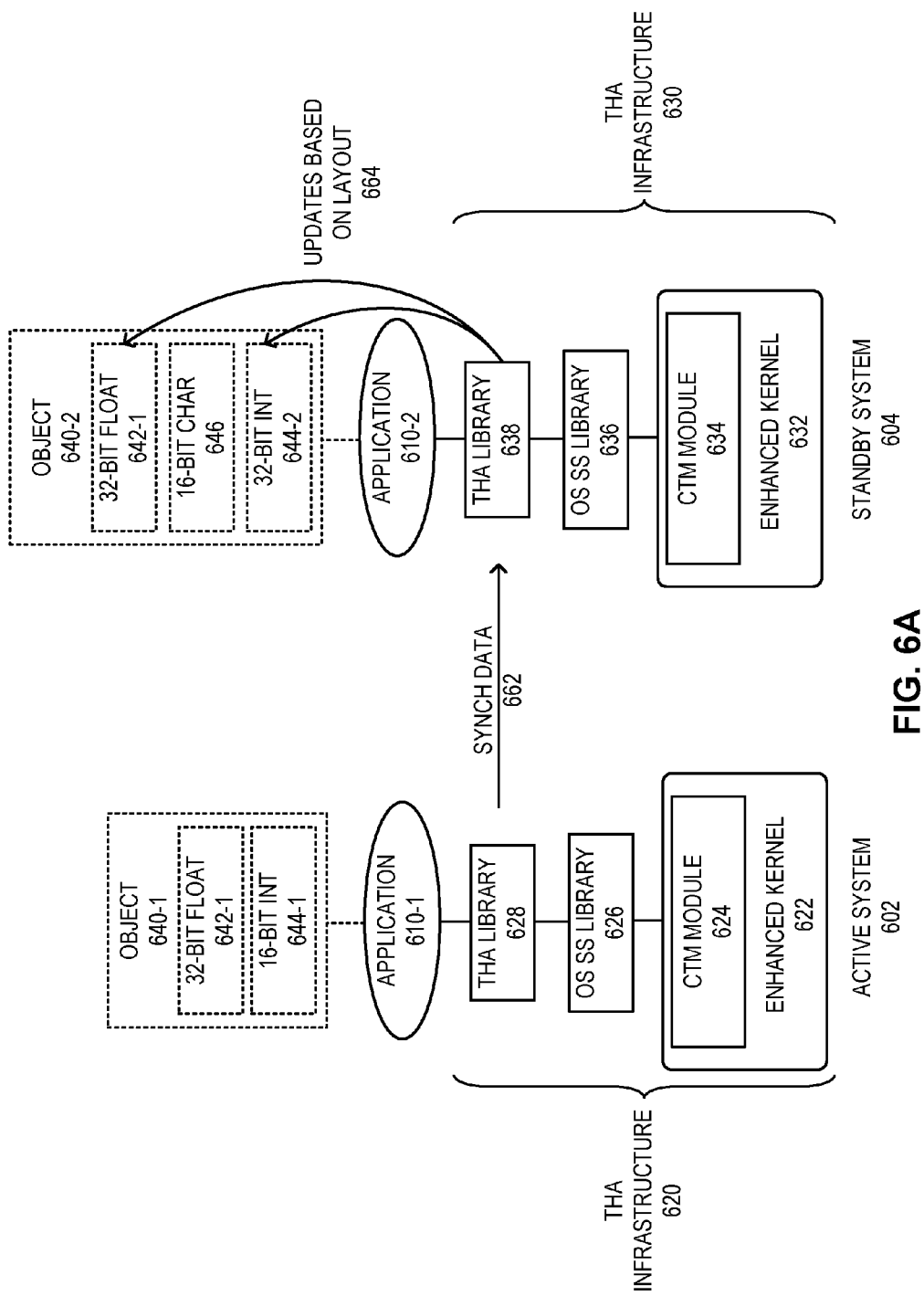
FIG. 6A illustrates an exemplary data update using data mapping, in accordance with an embodiment of the present invention.

FIG. 6A illustrates an exemplary data update using data mapping, in accordance with an embodiment of the present invention. Active system 602 includes transparent high availability infrastructure 620, which includes transparent high availability library 628, coordinated transaction manager module 624, and enhanced kernel 622. Standby system 604 includes transparent high availability infrastructure 630, which includes transparent high availability library 638, coordinated transaction manager module 634, and enhanced kernel 632. Libraries 628 and 638 operate based on the operating system synchronization service libraries 626 and 636, respectively. Infrastructures 620 and 630 facilitate synchronization to applications 610-1 and 610-2, respectively, as described in conjunction with FIG. 2.

During operation, application 610-1 modifies object 640-1 and instructs library 628 to synchronize the state of application 610-1. Object 640-1 includes 32-bit floating point 642-1 and 16-bit integer 644-1. Library 628 obtains from enhanced kernel 622 a bitmap indicating the modified pages and sends object 640-1 data update to infrastructure 630 (operation 662). Upon receiving the data update, library 638 uses the object identifier (e.g., object name or address) to locate the corresponding object 640-2 associated with corresponding application 610-2 in standby system 604.

Library 638 identifies 32-bit floating point 642-2 and 32-bit integer 644-2 as the matching fields in object 640-2. In some embodiments, the matching fields are identified based on identical names. Based on the data layout of object 640-1, library 638 recognizes that floating point 642-2 has the same offset and bit-size that floating point 642-1 has in object 640-1. Hence, library 638 updates the value of floating point 642-2 with the value of floating point 642-1. However, library 638 recognizes that integer 644-2 has a different offset than integer 644-1 has in object 640-1 because a 16-bit character 646 resides between floating point 642-2 and integer 644-2 in object 640-2. Library 638 also recognizes that integer 644-2 is 32 bits long whereas corresponding integer 644-1 is 16 bits long. Based on the data layout of object 640-2, library 638 automatically locate the new offset and bit-size of integer 644-2, and performs necessary conversion (e.g., bit stuffing for additional bits) to update integer 644-2 with the value of integer 644-1 (operation 664).

Figure 6B:
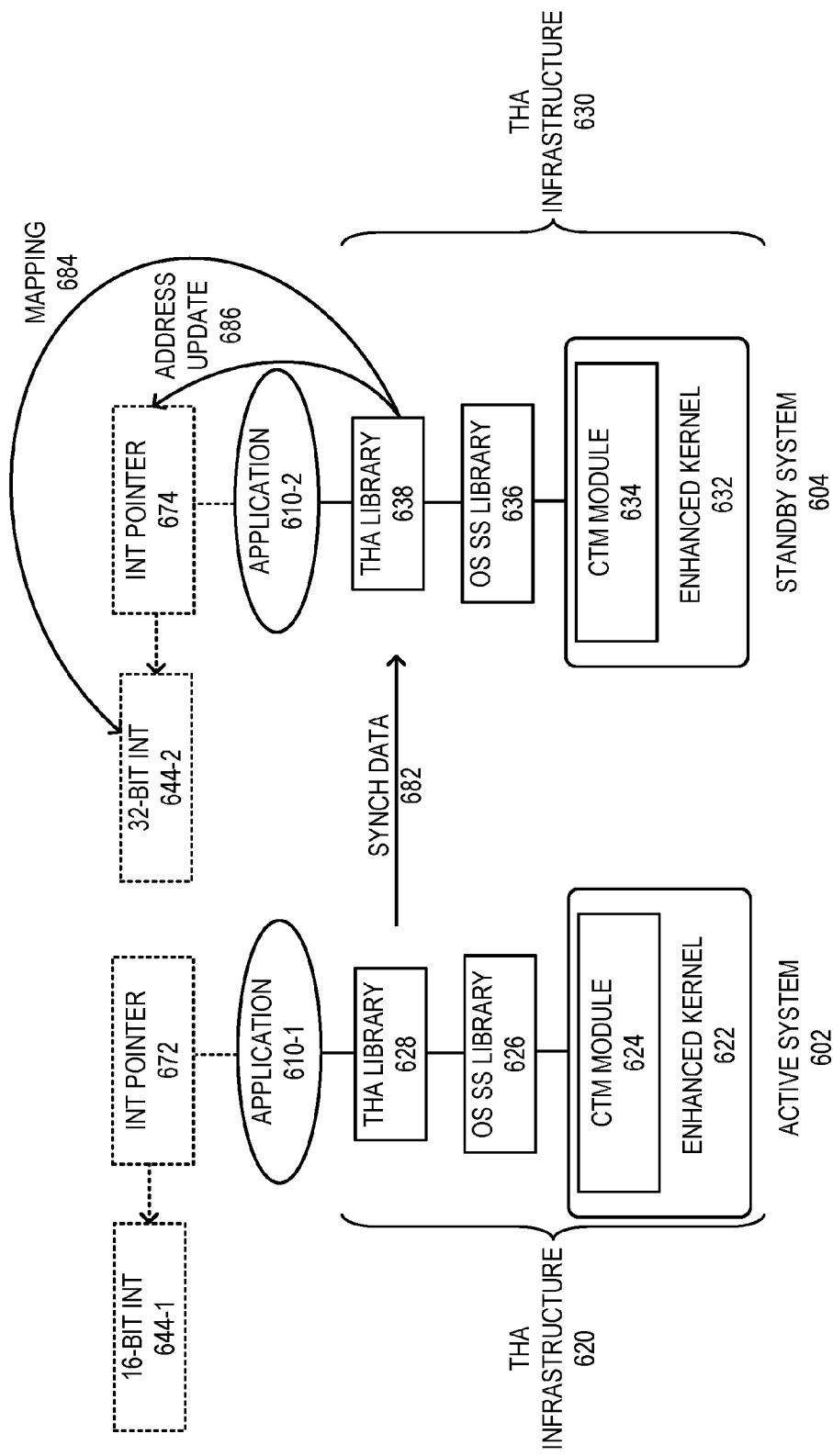
FIG. 6B illustrates an exemplary data update using pointer conversion, in accordance with an embodiment of the present invention.

Because corresponding objects in active and standby systems (e.g., objects 640-1 and 640-2) can reside on different memory locations, respective transparent high availability libraries convert pointer values to point to an equivalent object/field in standby system 604. FIG. 6B illustrates an exemplary data update using pointer conversion, in accordance with an embodiment of the present invention. During operation, application 610-1 instructs library 628 to synchronize an object 672 (which points to integer object 644-1). Library 628 sends object 672 data to infrastructure 630 (operation 682). Upon receiving the data, library 638 uses the object identifier (e.g., object name or address) to locate the corresponding integer pointer 674, which points to corresponding integer 644-2, in standby system 604 and checks whether object 674 has been changed.

Library 638 looks up the active snapshot to find the object corresponding to the pointer value in object 672, which is object 644-1, and maps it to equivalent object 644-2 in standby system 604 (operation 684). Library 638 also stores the address of object 644-2 in integer pointer object 674 (operation 686). In some embodiments, library 638 also supports mapping of nested pointers, including arrays and nested structures. For example, if pointer 672 points to an element in an integer array, library 638 first identifies the beginning of the array. Library 638 uses the data layout of the array to locate the corresponding array element pointed by the pointer. Library 638 then applies the same nested traversal on pointer 674 to locate the corresponding location in system 604. In this way, if elements in the array in system 602 are 16-bit integers and the elements in the array in system 604 are 32-bit integers, library 638 can still identify the location and size of the array element.

Similarly, if object 644-1 and object 644-2 are structures with two fields, respectively, and object 672 points to the second field of object 644-1, library 638 transforms that pointer value to point to the second field of object 644-2. Furthermore, library 638 stores the address of the second field of object 644-2 in object 674 in standby system 604. As a result, any modification indicated by the pointer value of object 672 can readily be transformed to the corresponding modification indicated by the pointer value of object 674. In some embodiments, this automatic data transformation feature allows an application to use just the serialization/de-serialization aspect of infrastructures 620 and 630. Application 610-1 can send an opaque message/data from active system 602 to standby system 604. During operation, application 610-1 can specify the layout of the opaque message/data to infrastructure 620 and instruct infrastructure 620 to transform the opaque message/data. Consequently, upon receiving the message/data, infrastructure 630 transforms the message/data and deposits the transformed data directly in the data buffer of application 610-2.

Transparent Synchronization

Figure 7A:
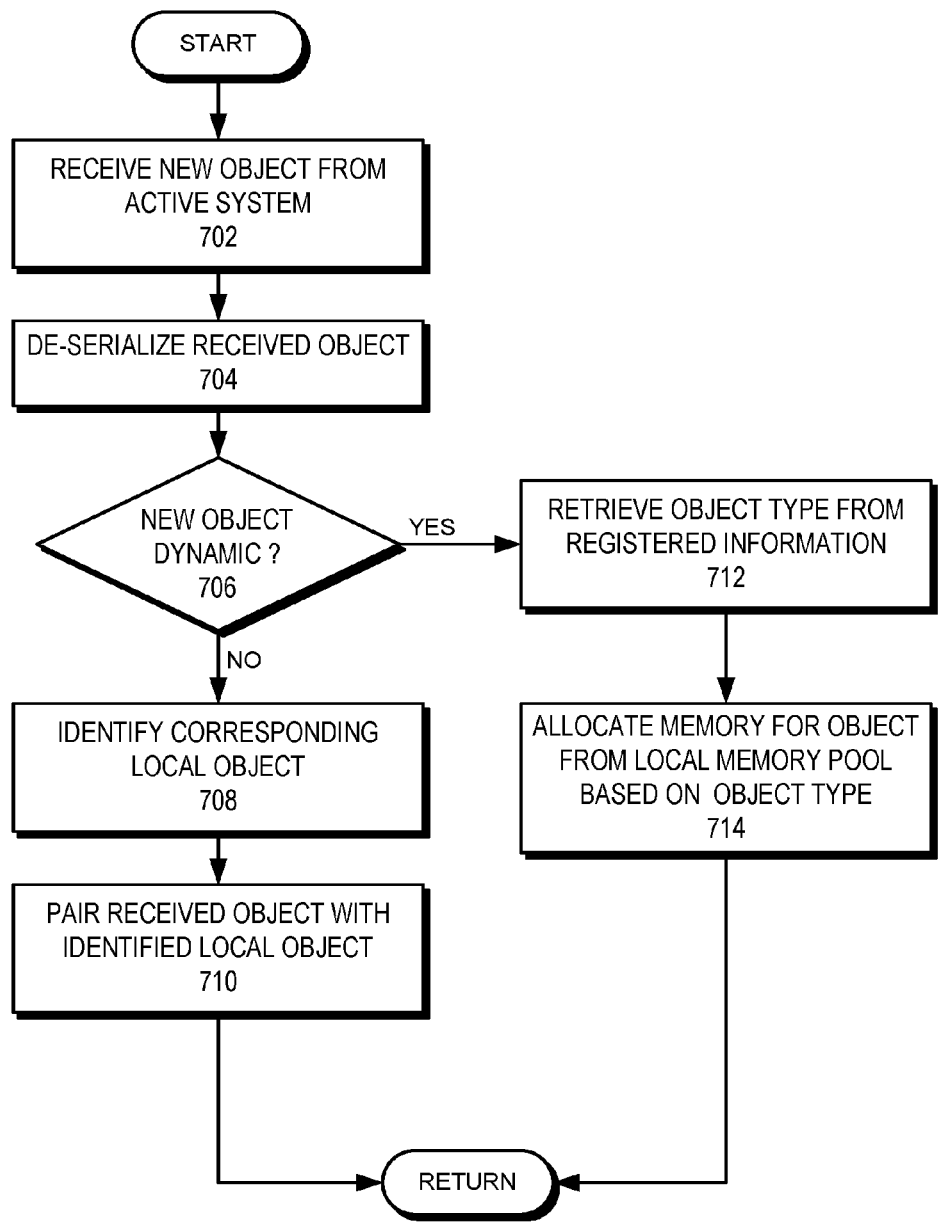
FIG. 7A presents a flowchart illustrating the process of a transparent high availability infrastructure in a standby system synchronizing a new object, in accordance with an embodiment of the present invention.

FIG. 7A presents a flowchart illustrating the process of the transparent high availability infrastructure in a standby system synchronizing a new object, in accordance with an embodiment of the present invention. This process corresponds to operation 356 in FIG. 3C. Upon receiving a new object from an active system (operation 702), the infrastructure de-serializes the received object (operation 704). The infrastructure checks whether the new object is a dynamic object (operation 706). If so, the infrastructure retrieves the object type, which can include object layout, from the registered information associated with the object (operation 712). The infrastructure then allocates memory for the object from a local memory pool based on the object type (operation 714). For example, if the object type is a 32-bit integer and the dynamic object is a 10-element array, the infrastructure allocates 320 bits (i.e., 40 bytes) from the local memory pool. If the object is not a dynamic object (i.e., the object is a static object), the infrastructure identifies the local object which corresponds to the received object (operation 708) and pairs the received object with the identified local object (operation 710).

Figure 7B:
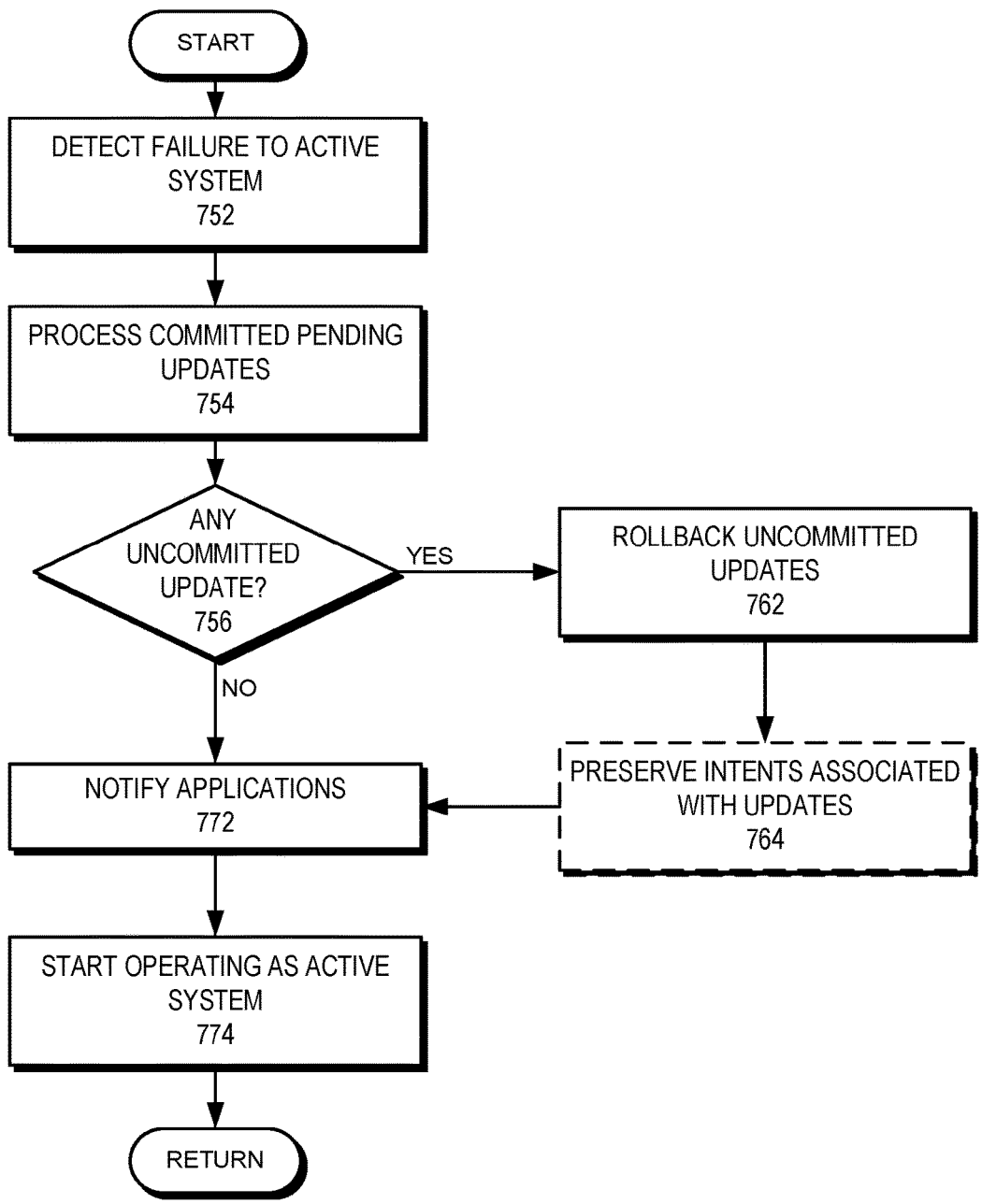
FIG. 7B presents a flowchart illustrating the fault failover process of a transparent high availability infrastructure in a standby system, in accordance with an embodiment of the present invention.

FIG. 7B presents a flowchart illustrating the failover process of a transparent high availability infrastructure in a standby system, in accordance with an embodiment of the present invention. Upon detecting a failure to the active system (operation 752), the infrastructure processes the committed pending updates (operation 754). The infrastructure then checks for any uncommitted updates (operation 756). If the infrastructure does not have any uncommitted update, the infrastructure notifies the applications in the standby system (operation 772) and starts operating as the active system (operation 774). On the other hand, upon detecting any uncommitted update, the infrastructure rolls back the uncommitted updates (operation 762) to ensure consistency.

In some embodiments, the infrastructure can also preserve the intents associated with the uncommitted updates (operation 764). An intent is an abstract representation of an operation to be performed by an application in the active system. The application performing the operation can register its intents, which can be of an opaque data type, with a transaction. An active system sends these intents to the standby system immediately. The standby system preserves these intents for the uncommitted transactions. Once committed, the standby system discards these intents. If the intents associated with uncommitted transactions are preserved, the application can retrieve the intents after the failover and re-execute the operations specified by the intent. After preserving the intents, the infrastructure notifies the applications in the standby system (operation 772) and starts operating as the active system (operation 774).

Coordinated State Synchronization

Figure 8:
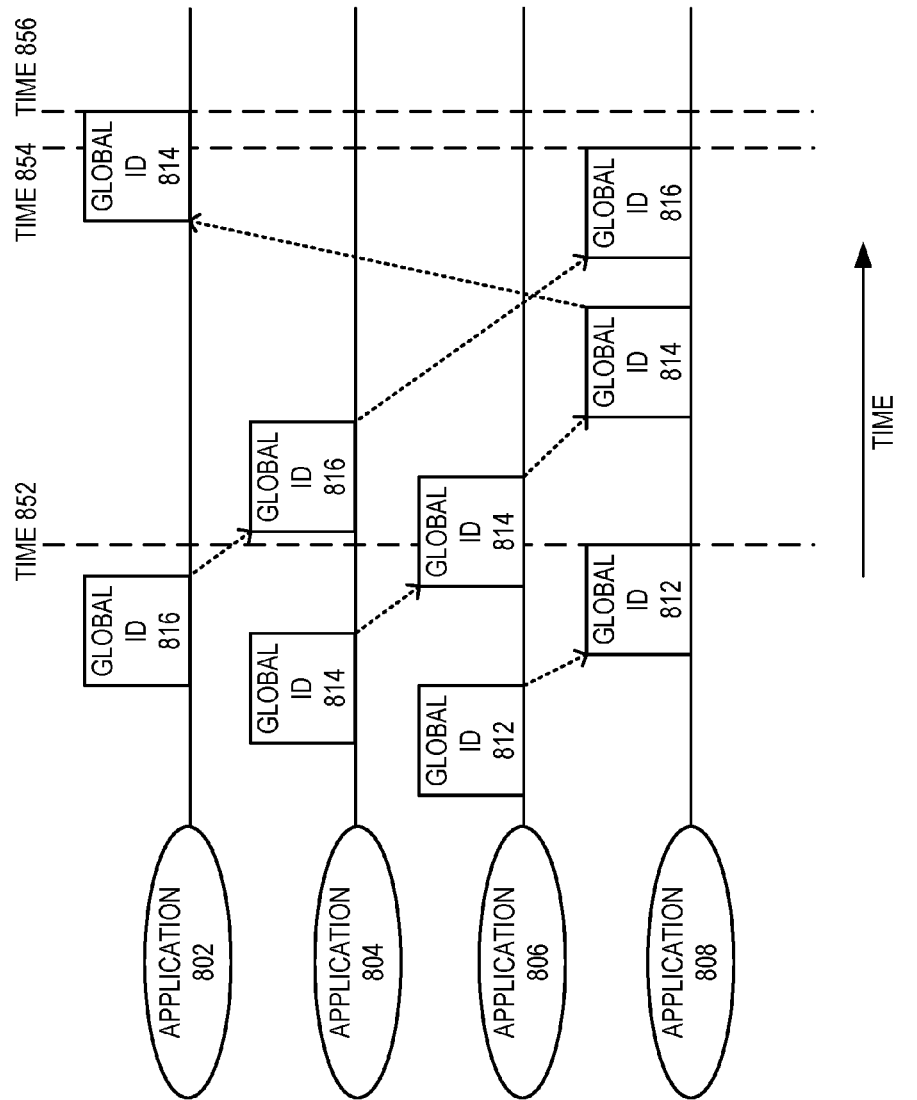
FIG. 8 illustrates an exemplary coordinated synchronization, in accordance with an embodiment of the present invention.

Coordinated synchronization across multiple related applications avoids state reconciliation. FIG. 8 illustrates an exemplary coordinated synchronization, in accordance with an embodiment of the present invention. During operation, application 802 (can be referred to as the initiating application) initiates the coordinated synchronization for related applications 802, 804, and 808. Application 802 obtains a unique transaction identifier 816 for the coordinated synchronization and informs applications 804 and 806 about identifier 816. In some embodiments, application 802 constructs a message, which can be a multicast message, to inform applications 804 and 806 about identifier 816. Applications 802, 804, and 808 update their respective state using the same transaction identifier 816 without committing. In some embodiments, coordinated transaction manager kernel module (e.g., module 202 in FIG. 2) is responsible for managing transaction identifier and tracking of the transaction dependencies.

In some embodiments, the developers of applications 802, 804, and 808 predefine their execution sequence. When a respective application has completed the update, one of the applications notifies (can be referred to as the notifying application) the transparent high availability infrastructure to commit all changes associated with transaction identifier 816. In some embodiments, initiating application 802 can be the notifying application. Upon finishing the respective updates, applications 804 and 808 notify application 802. Application 802 then notifies the infrastructure to commit all changes associated with transaction identifier 816. Alternatively, the last application in the execution order, application 808, instructs the infrastructure to commit.

In some embodiments, the infrastructure of the standby system maintains a counter value indicating the number of related applications associated with an identifier. For example, for identifier 816, the number of applications is 3. During operation, when application 802 completes the update, application 802 notifies the infrastructure. The infrastructure, in turn, decrements the counter value to 2. Similarly, upon completion, applications 804 and 808 notify the infrastructure, which in turn, decrements the value of the counter for a respective application. When the value reaches zero, the infrastructure considers the updates associated with identifier 816 to be ready to commit. In some further embodiments, application 802 notifies the infrastructure about applications 802, 804, and 808 as the participant in the coordinated synchronization associated with identifier 816. Applications 802, 804, and 808 independently commit their respective updates. Once the infrastructure detects that all participants have committed the updates, the infrastructure commits all updates.

When the infrastructure in a standby system receives state update requests from applications 802, 806, and 808, the transparent high availability library of the infrastructure notifies the corresponding kernel module about the request and queues the requests in memory. The kernel module tracks the state updates based on transaction identifier 816 as uncommitted transactions. The kernel module maintains a queue of uncommitted updates for applications 802, 806, and 808, and builds a corresponding dependency map for applications 802, 806, and 808. When application 802 or 808 requests the library to commit the updates, the library consults the dependency map to determine whether the updates can be committed. When the dependency map indicates no further dependency, the library notifies corresponding applications to commit the queued states.

In the example in FIG. 8, application 804 initiates the coordinated synchronization for related applications 804, 806, 808, and 802 using transaction identifier 814. Similarly, application 806 initiates the coordinated synchronization for related applications 806 and 808 using transaction identifier 812. Because state updates are committed in temporal order, when a second update depends on a first update, the second update is committed only when the first update is committed. The kernel module enforces the dependency among updates executing in different order in different applications. For example, at time 852, the kernel module determines that updates associated with identifier 812 are completed by all related applications. The kernel module then notifies applications 806 and 808 to commit the updates.

On the other hand, application 808 or 802 requests the library to commit updates associated with identifier 816 at time 854. However, applications 804 and 808 perform updates associated with both identifiers 814 and 816, and updates associated with identifier 814 have not been completed at time 854. As a result, the library does not commit the updates associated with identifier 816 at time 854. Only when application 802 or 804 requests the library to commit updates associated with identifier 814 at time 856, the kernel module notifies applications 802, 804, 806, and 808 to commit updates associated with both identifiers 814 and 816.

Suppose that the active system fails at time 854. By time 854, the updates associated with identifier 812 have been committed. However, because of the dependency, the updates associated with identifiers 814 and 816 have not been committed. As a result, the infrastructure of the standby system discards the updates associated with identifiers 814 and 816. In some embodiments, an application can register its intents using identifiers 814 and 816. During the failover process, if a respective transaction is not committed in the standby system, the application retrieves the intents associated with identifiers 814 and 816, and re-executes the operations specified by the intents.

Figure 9:
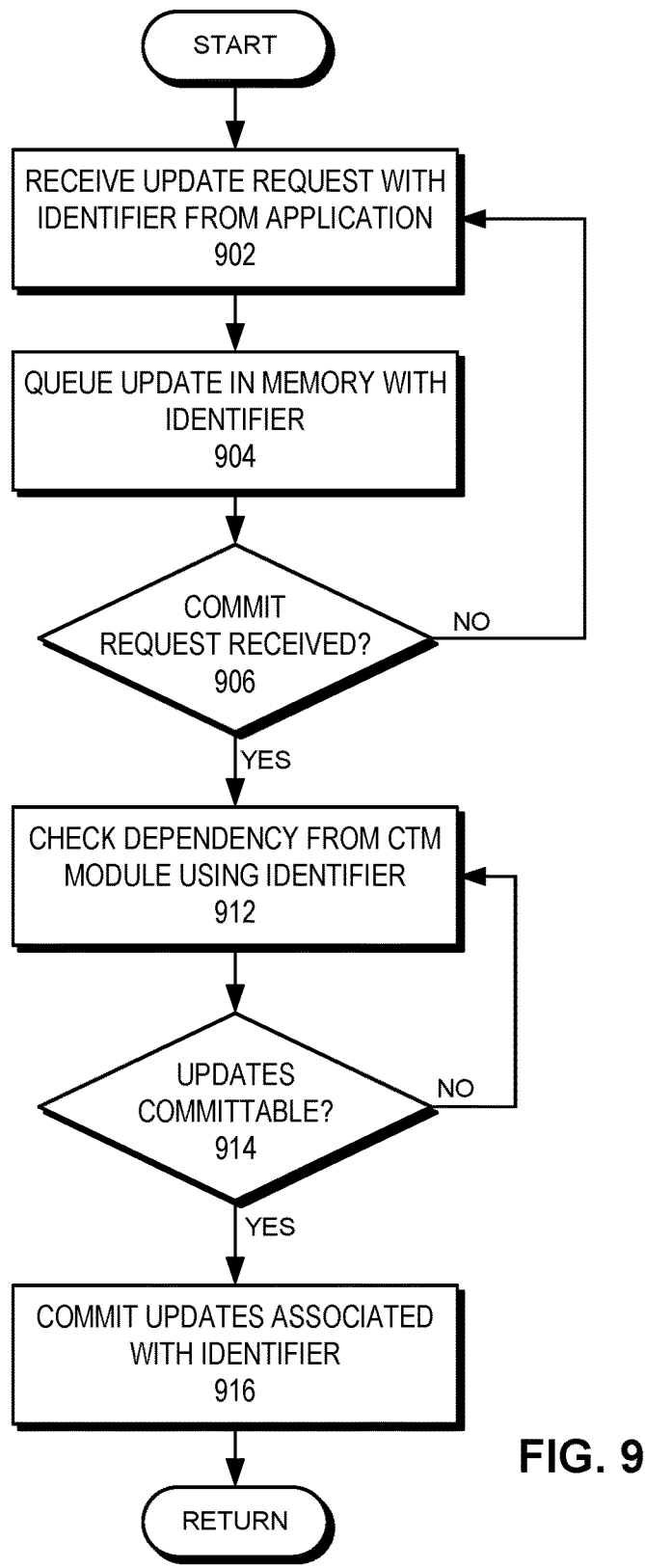
FIG. 9 presents a flowchart illustrating the coordinated synchronization process of a transparent high availability infrastructure, in accordance with an embodiment of the present invention.

FIG. 9 presents a flowchart illustrating a coordinated synchronization process of the transparent high availability infrastructure in an active system, in accordance with an embodiment of the present invention. The infrastructure receives an update request with a transaction identifier from an application (operation 902). The infrastructure queues the request in memory (operation 904) and checks whether the infrastructure has received a commit request associated with the identifier (operation 906). If not, the infrastructure continues to receive update requests (operation 902).

If the infrastructure has received a commit request associated with the identifier, the infrastructure checks dependency associated with the identifier from coordinated transaction manager kernel module (operation 912). In some embodiments, the infrastructure uses a dependency map to check the dependency. The infrastructure determines whether the updates associated with the identifier are committable (operation 914). In the example in FIG. 8, the infrastructure determines that the updates associated with identifier 816 are not committable at time 854. If the updates are not committable, the infrastructure continues to check for dependency (operation 912). Otherwise, if the updates are committable, the infrastructure commits the updates associated with the identifier (operation 916). In some embodiments, the infrastructure notifies the applications to commit the updates.

Exemplary System

Figure 10:
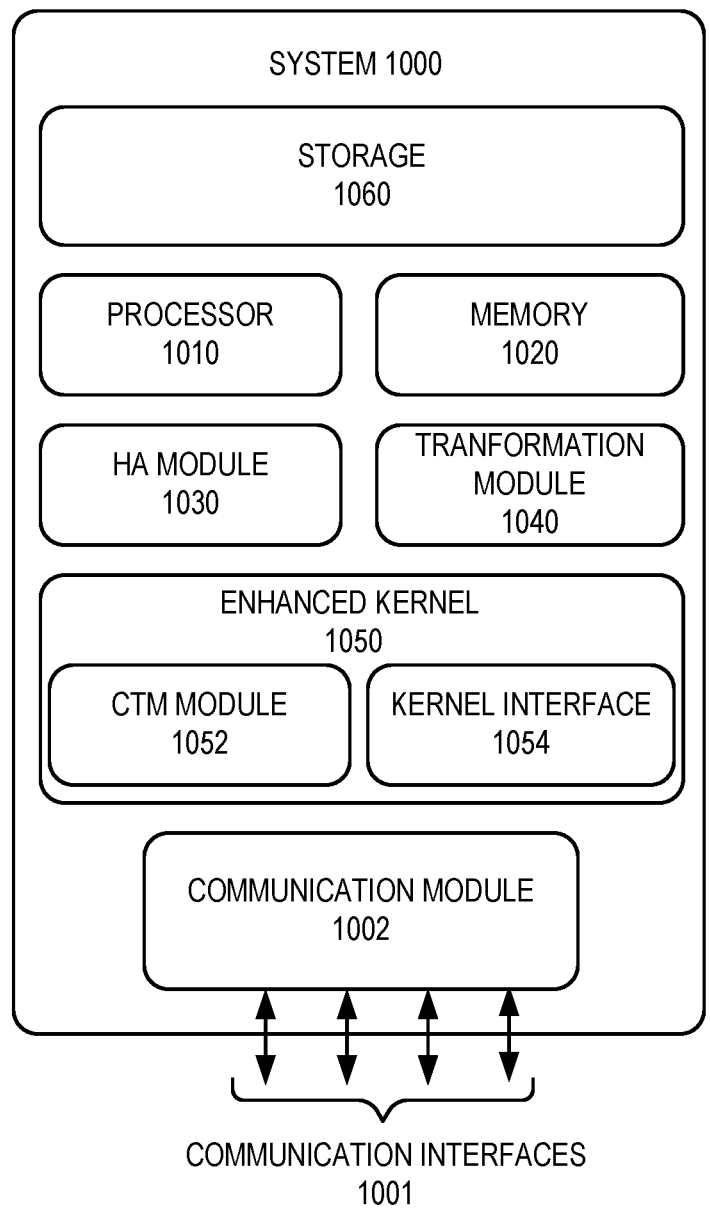
FIG. 10 illustrates an exemplary system with a transparent high availability infrastructure, in accordance with an embodiment of the present invention.

FIG. 10 illustrates an exemplary system with a transparent high availability infrastructure, in accordance with an embodiment of the present invention. In this example, a system 1000 includes a processor 1010, a memory 1020, a high availability module 1030, a transformation module 1040, an enhanced kernel 1050, and a storage 1060. Enhanced kernel 1050 includes a coordinated transaction manager module 1052 and a kernel interface 1054. System 1000 can also include a communication module 1002 capable of communicating via a shared segment of memory 1020, a data bus in system 1000, or the communication interfaces 1001. Kernel interface module 1054 can detect the modified pages in memory 1020. In some embodiments, system 1000 can be a switch. Under such a scenario, processor 1010 processes data frames received via communication ports 1001.

During operation, an application in system 1000 registers its fault resilient states with high availability module 1030. High availability module 1030 obtains a modified memory page from a second system associated with a fault resilient application. High availability module 1030 identifies the objects in the received modified page and identifies a modified object. High availability module 1030 then identifies an object in memory 1020, which has the same name as the modified object and is associated with a standby application in system 1000 corresponding to the fault resilient application.

Transformation module 1040 transforms the value of the modified object to a value assignable to the local object, as described in conjunction with FIGS. 6A and 6B. After the data transformation, high availability module 1030 updates the current value of the local object with the transformed value. If high availability module 1030 receives updates for multiple objects associated with a transaction identifier, high availability module 1030 commits the updates only after receiving and determining all changes associated with the transaction identifier. High availability module 1030 also allocates dynamic memory a from a memory pool residing in memory 1020 and available to high availability module 1030.

In some embodiments, high availability module 1030 stores a plurality of updates identified by a transaction identifier in memory 1020. Coordinated transaction manager module 1052 assigns the transaction identifier to the updates and maintains a dependency map for the plurality of applications causing the updates. High availability module 1030 commits the updates upon receiving a commit request and when the dependency map indicates that the applications have no further dependency. In some embodiments, coordinated transaction manager module 1052 can maintain the dependency using a counter value. If high availability module 1030 detects a failure to the second system before committing the updates, high availability module 1030 discards the updates.

Note that the above-mentioned modules can be implemented in hardware as well as in software. In one embodiment, these modules can be embodied in computer-executable instructions stored in a memory which is coupled to one or more processors in system 1000. When executed, these instructions cause the processor(s) to perform the aforementioned functions.

In summary, embodiments of the present invention provide a system and a method for transparently providing high availability. In one embodiment, the system includes a high availability module and a data transformation module. During operation, the high availability module identifies a modified object belonging to an application in a second system. A modification to the modified object is associated with a transaction identifier. The high availability module also identifies a local object corresponding to the modified object associated with a standby application corresponding to the application in the second system. The data transformation module transforms the value of the modified object to a value assignable to the local object. The high availability module updates the current value of the local object with the transformed value.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer system for providing high availability, comprising: a processor; and
a storage device coupled to the processor and storing instructions that when executed by the processor cause the processor to perform a method, the method comprising:
in response to detecting a failure associated with an object, identifying, by a first high availability module, a pending update which indicates a modified state for a snapshot object, wherein the modified state is different from a state for a corresponding standby object, wherein the snapshot object is a snapshot of the object, and wherein the standby object a standby for the object and is registered with the first high availability module;
in response to determining that the standby object is a dynamic object, allocating memory for the standby object from a local memory pool based on a type of the standby object;
in response to determining that the standby object is not a dynamic object, pairing the standby object with a local object that corresponds to the standby object;
determining whether the pending update is committed in the snapshot object;
in response to the pending update being committed in the snapshot object, processing the pending update for the standby object; and
in response to the pending update being uncommitted in the snapshot object, refraining from processing the pending update for the standby object.

2. The computer system of claim 1, wherein the method further comprises:
de-serializing the second standby object; and determining whether the second object is a dynamic object.

3. The computer system of claim 1, wherein in response to the pending update being uncommitted in the snapshot object, and in response to identifying no other pending updates that are uncommitted, the method further comprises:
generating a notification message for local applications of the system; and
initiating operation as an active system.

4. The computer system of claim 1, wherein in response to the pending update being uncommitted in the snapshot object, the method further comprises:
rolling back the uncommitted update.

5. The computer system of claim 1, wherein the first-snapshot object corresponds to a third object that is registered with a second high availability module in a second system.

6. The computer system of claim 5, wherein the second standby object and the third object have a same transaction identifier, wherein the identifier is unique in a standby application associated with the second standby object and a working application associated with the third object.

7. The computer system of claim 6, wherein the method further comprises:
determining an intent associated with the same transaction identifier, wherein the intent specifies an operation to be performed by an application in the second system; storing the intent;
wherein in response to the pending update being committed in the snapshot object, the method further involves discarding the intent; and
wherein in response to the pending update being uncommitted in the snapshot object, the method further involves preserving the intent.

8. A computer-implemented method, comprising
in response to detecting a failure associated with an object, identifying, by a first high availability module, a pending update which indicates a modified state for a snapshot object, wherein the modified state that is different from a state for a corresponding standby object, wherein the snapshot object is a snapshot of the object, and wherein the standby object is a standby for the object and registered with the first high availability module;
in response to determining that the standby object is a dynamic object, allocating memory for the standby object from a local memory pool based on a type of the standby object;
in response to determining that the standby object is not a dynamic object, pairing the standby object with a local object that corresponds to the standby object;
determining whether the pending update is committed in the snapshot object;
in response to the pending update being committed in the snapshot object, processing the pending update for the standby object; and
in response to the pending update being uncommitted in the snapshot object, refraining from processing the pending update for the standby object.

9. The method of claim 8, further comprising:
de-serializing the second standby object; and determining whether the second object is a dynamic object.

10. The method of claim 8, wherein in response to the pending update being uncommitted in the snapshot object, and in response to identifying no other pending updates that are uncommitted, the method further comprises:
generating a notification message for local applications of the system; and
initiating operation as an active system.

11. The method of claim 8, wherein in response to the pending update being uncommitted in the snapshot object, the method further comprises:
rolling back the uncommitted update.

12. The method of claim 8, wherein the snapshot object corresponds to a third object that is registered with a second high availability module in a second system.

13. The method of claim 12, wherein the standby object and the third object have a same transaction identifier, wherein the identifier is unique in a standby application associated with the second standby object and a working application associated with the third object.

14. The method of claim 13, further comprising:
determining an intent associated with the same transaction identifier, wherein the intent specifies an operation to be performed by an application in the second system; storing the intent;
wherein in response to the pending update being committed in the snapshot object, the method further involves discarding the intent; and
wherein in response to the pending update being uncommitted in the snapshot object, the method further involves preserving the intent.

15. A non-transitory computer-readable storage medium storing instructions that when executed by a computer cause the computer to perform a method, the method comprising:
in response to detecting a failure associated with an object, identifying, by a first high availability module of a system, a pending update which indicates a modified state for a snapshot object, wherein the modified state that is different from a state for a corresponding standby object, wherein the snapshot object is a snapshot of the object, and wherein the standby object is a standby for the object and registered with the first high availability module;

in response to determining that the standby object is a dynamic object, allocating memory for the standby object from a local memory pool based on a type of the standby object;

in response to determining that the standby object is not a dynamic object, pairing the standby object with a local object that corresponds to the standby object;

determining whether the pending update is committed in the snapshot object;

in response to the pending update being committed in the snapshot object, processing the pending update for the standby object; and in response to the pending update being uncommitted in the snapshot object, refraining from processing the pending update for the standby object.

16. The storage medium of claim 15, wherein the method further comprises:

de-serializing the second standby object.

* * * * *